United States Patent
Kusama

(10) Patent No.: US 11,586,199 B2
(45) Date of Patent: Feb. 21, 2023

(54) VEHICLE AND POWER SUPPLY SYSTEM OF VEHICLE

(71) Applicant: TOYOTA JIDOSHA KABUSHIKI KAISHA, Toyota (JP)

(72) Inventor: Eiichi Kusama, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/722,541

(22) Filed: Apr. 18, 2022

(65) Prior Publication Data
US 2022/0244724 A1 Aug. 4, 2022

Related U.S. Application Data

(63) Continuation of application No. 17/154,081, filed on Jan. 21, 2021.

(30) Foreign Application Priority Data

Jan. 31, 2020 (JP) .............................. JP2020-015725

(51) Int. Cl.
*G05D 1/00* (2006.01)
*B60W 30/02* (2012.01)
*B60W 30/188* (2012.01)

(52) U.S. Cl.
CPC ........... *G05D 1/0022* (2013.01); *B60W 30/02* (2013.01); *B60W 30/188* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | |
|---|---|---|---|
| 10,513,184 B2* | 12/2019 | Lee | G06V 20/597 |
| 2018/0144642 A1* | 5/2018 | High | G06Q 50/28 |
| 2018/0370540 A1 | 12/2018 | Yousuf et al. | |
| 2019/0084425 A1 | 3/2019 | Liu et al. | |
| 2019/0100105 A1 | 4/2019 | Liu et al. | |
| 2019/0176638 A1* | 6/2019 | Anderson | B60W 10/08 |
| 2019/0303557 A1* | 10/2019 | Ando | H04L 9/3239 |
| 2020/0398680 A1 | 12/2020 | Du et al. | |
| 2021/0005939 A1 | 1/2021 | Tajima et al. | |
| 2021/0046945 A1 | 2/2021 | Ju et al. | |
| 2021/0135578 A1 | 5/2021 | Tanaka et al. | |
| 2021/0242712 A1 | 8/2021 | Izawa et al. | |
| 2021/0300321 A1 | 9/2021 | Toda et al. | |

FOREIGN PATENT DOCUMENTS

| | | |
|---|---|---|
| JP | 2018-132015 A | 8/2018 |
| JP | 2019-126208 A | 7/2019 |

OTHER PUBLICATIONS

Office Action dated May 13, 2022 in U.S. Appl. No. 17/154,081 (references 1-6 cited therein).

* cited by examiner

*Primary Examiner* — Tyler D Paige
(74) *Attorney, Agent, or Firm* — Oblon, McClelland, Maier & Neustadt, L.L.P.

(57) ABSTRACT

A vehicle includes an ADK that creates a driving plan, a VP that carries out vehicle control in accordance with various commands from the ADK, and a vehicle control interface that interfaces between the VP and the ADK. A power supply structure for the ADK is provided independently of a power supply structure for the VP.

10 Claims, 18 Drawing Sheets

FIG.7

| | |
|---|---|
| #1: CREATING A DRIVING PLAN | THE ADS CREATES A DRIVING PLAN. |
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

VEHICLE AND POWER SUPPLY SYSTEM OF VEHICLE

This is a continuation of U.S. application Ser. No. 17/154,081, filed on Jan. 21, 2021, which is based on Japanese Patent Application No. 2020-015725 filed with the Japan Patent Office on Jan. 31, 2020, the entire contents of which are hereby incorporated by reference.

BACKGROUND

Field

The present disclosure relates to a vehicle including an autonomous driving system and a power supply system of a vehicle.

Description of the Background Art

Japanese Patent Laying-Open No. 2018-132015 discloses a vehicle incorporating an autonomous driving system. The vehicle incorporates a motive power system, a power supply system, and the autonomous driving system. The motive power system manages motive power of the vehicle in a centralized manner. The power supply system manages charging and discharging power of a battery mounted on the vehicle or supply of electric power to various vehicle-mounted devices in a centralized manner. The autonomous driving system carries out autonomous driving control of the vehicle in a centralized manner. An engine ECU of the motive power system, a power supply ECU of the power supply system, and an autonomous driving ECU of the autonomous driving system are communicatively connected to one another over a vehicle-mounted network.

An autonomous driving system developed by an autonomous driving system developer may externally be attached to a vehicle main body. In this case, autonomous driving is carried out under vehicle control by a vehicle platform (which will be described later) in accordance with an instruction from the externally attached autonomous driving system.

In such a vehicle, how to configure a power supply of the externally attached autonomous driving system is important. Depending on a power supply structure, under the influence by a failure that occurs in a power supply system of the autonomous driving system, reliability of the power supply system of the vehicle main body may be lowered. Japanese Patent Laying-Open No. 2018-132015 does not particularly discuss such an aspect.

SUMMARY

The present disclosure was made to solve the above-described problem, and an object of the present disclosure is to ensure reliability of a power supply of a vehicle platform in a vehicle that carries out autonomous driving.

A vehicle according to the present disclosure includes an autonomous driving system (an ADS or an ADK) that creates a driving plan, a vehicle platform (VP) that carries out vehicle control in accordance with an instruction from the autonomous driving system, and a vehicle control interface box (VCIB) that interfaces between the vehicle platform and the autonomous driving system. The autonomous driving system includes a power supply structure independently of a power supply structure for the vehicle platform.

In the vehicle, the power supply of the autonomous driving system is independent of the power supply of the vehicle platform. Therefore, when a failure occurs in the power supply of the autonomous driving system, the power supply of the vehicle platform is not affected by the failure of the power supply of the autonomous driving system. Therefore, according to this vehicle, reliability of the power supply of the vehicle platform can be ensured.

The vehicle platform may include a high-voltage battery, a first primary power supply system that receives supply of electric power from the high-voltage battery and a first secondary power supply system as a redundant power supply for the vehicle platform. The autonomous driving system may include a second primary power supply system that receives supply of electric power from the high-voltage battery and a second secondary power supply system as a redundant power supply for the autonomous driving system.

In the vehicle, a secondary power supply system as the redundant power supply is provided in each of the power supply of the vehicle platform and the power supply of the autonomous driving system, and the redundant power supply is provided in each of the autonomous driving system and the vehicle platform independently of each other. Thus, for example, when the power feed function of the second primary power supply system fails and power feed by the second secondary power supply system (redundant power supply) is carried out in the autonomous driving system, the first secondary power supply system (redundant power supply) of the vehicle platform is not affected thereby. Therefore, according to this vehicle, reliability also of the redundant power supply can be ensured.

When a power feed function of the first primary power supply system fails, the first secondary power supply system may keep for a certain time period, feeding power to a limited system of systems that configure the vehicle platform.

According to the vehicle, a system to which power feed from the first secondary power supply system is continued in case of a failure of the power feed function of the first primary power supply system is limited. Therefore, power feed from the first secondary power supply system for a certain time period can be continued.

The limited system may include a brake system, a steering system, and a vehicle immobilization system.

According to the vehicle, the limited system above is set as the system to which power feed from the first secondary power supply system is continued in case of a failure of the power feed function of the first primary power supply system, so that at least a steering function and a standstill function of the vehicle can be ensured.

When a power feed function of the first primary power supply system fails, the first secondary power supply system may keep feeding power to the vehicle control interface box.

Thus, even though the power feed function of the first primary power supply system fails, the vehicle control interface box can continue interfacing between the vehicle platform and the autonomous driving system.

The first primary power supply system may include a DC/DC converter that subjects electric power from the high-voltage battery to voltage conversion and an auxiliary battery connected to an output of the DC/DC converter. The first secondary power supply system may include a switching DC/DC converter connected to the output of the DC/DC converter and a secondary battery connected to an output of the switching DC/DC converter. When a power feed function of the first primary power supply system fails, the switching DC/DC converter may electrically disconnect the secondary battery from the first primary power supply system.

In the vehicle, on the vehicle platform, when the power feed function of the first primary power supply system fails, the switching DC/DC converter electrically disconnects the secondary battery from the first primary power supply system. Thus, when the power feed function of the first primary power supply system fails, the secondary battery can be disconnected from the first primary power supply system in a shorter period of time than by means of a mechanical relay apparatus. Therefore, according to this vehicle, influence onto the second secondary power supply system in case of a failure of the power feed function of the first primary power supply system can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram showing a typical flow in an autonomous driving system.

DESCRIPTION OF THE PREFERRED EMBODIMENTS

Figure 1:
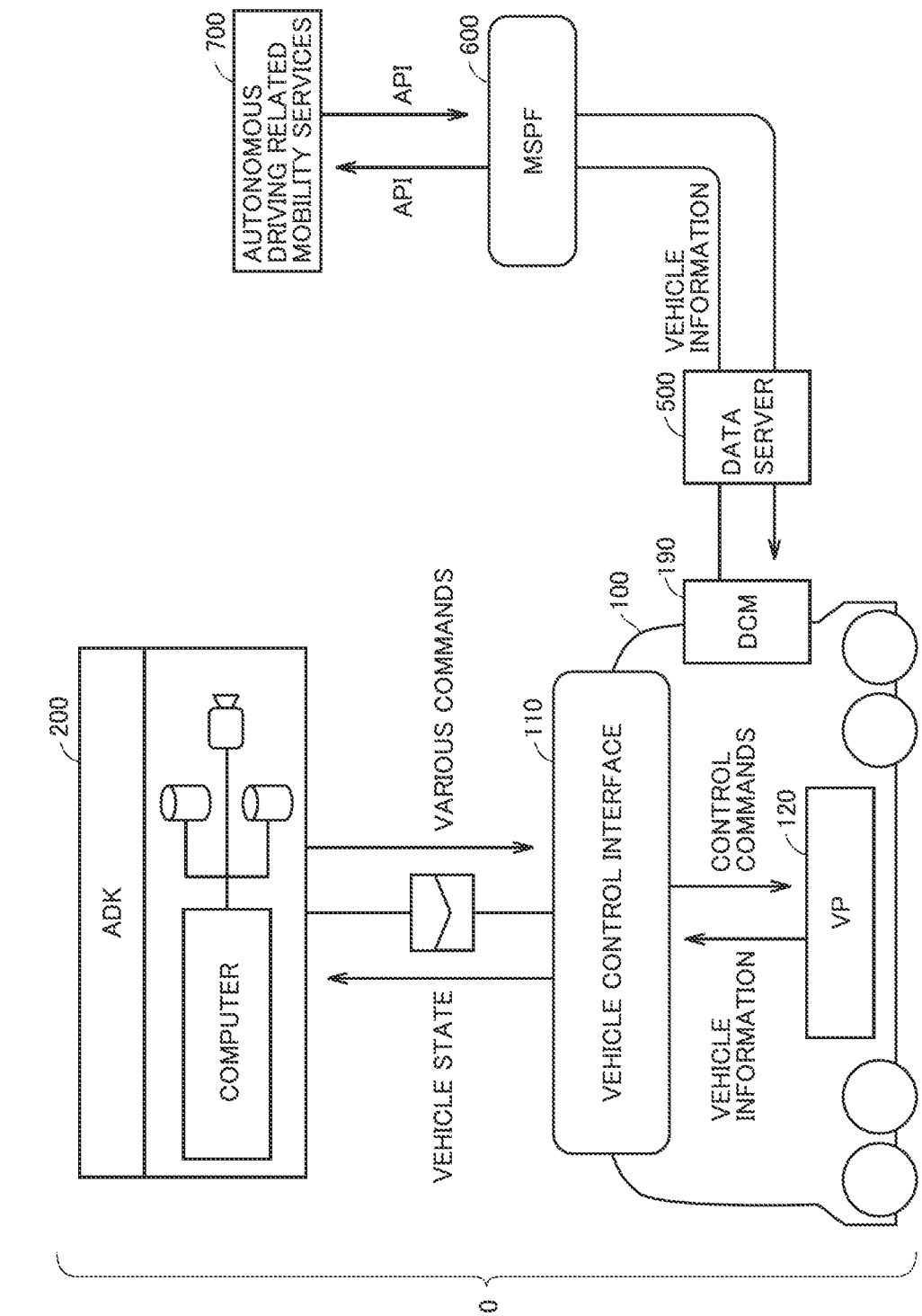
FIG. 1 is a diagram showing overview of a MaaS system in which a vehicle according to an embodiment of the present disclosure is used.

An embodiment of the present disclosure will be described below in detail with reference to the drawings. The same or corresponding elements in the drawings have the same reference characters allotted and description thereof will not be repeated.

FIG. 1 is a diagram showing overview of a mobility as a service (MaaS) system in which a vehicle according to an embodiment of the present disclosure is used.

Referring to FIG. 1, this MaaS system includes a vehicle 10, a data server 500, a mobility service platform (which is denoted as "MSPF" below) 600, and an autonomous driving related mobility services 700.

Vehicle 10 includes a vehicle main body 100 and an autonomous driving kit (which is denoted as "ADK" below) 200. Vehicle main body 100 includes a vehicle control interface 110, a vehicle platform (which is denoted as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by driving by a user. In this case, VP 120 carries out travel control (travel control in accordance with an operation by a user) in a manual mode.

Vehicle control interface 110 can communicate with ADK 200 over a controller area network (CAN). Vehicle control interface 110 receives various commands from ADK 200 or outputs a state of vehicle main body 100 to ADK 200 by executing a prescribed application programming interface (API) defined for each communicated signal.

When vehicle control interface 110 receives a command from ADK 200, it outputs a control command corresponding to the received command to VP 120. Vehicle control interface 110 obtains various types of information on vehicle main body 100 from VP 120 and outputs the state of vehicle main body 100 to ADK 200. A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is denoted as "ADS" below) for autonomous driving of vehicle 10. ADK 200 creates a driving plan of vehicle 10 and outputs various commands for traveling vehicle 10 in accordance with the created driving plan to vehicle control interface 110 in accordance with the API defined for each command. ADK 200 receives various signals indicating states of vehicle main body 100 from vehicle control interface 110 in accordance with the API defined for each signal and has the received vehicle state reflected on creation of the driving plan. A configuration of ADK 200 (ADS) will also be described later.

DCM includes a communication interface (I/F) for vehicle main body 100 to wirelessly communicate with data server 500. DCM 190 outputs various types of vehicle information such as a speed, a position, or an autonomous driving slate to data server 500. DCM 190 receives faun autonomous driving related mobility services 700 through MSPF 600 and data server 500, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS, and an ADS provider can use as the APIs, the data on the vehicle states and vehicle control necessary for development of the ADS stored in data server 500.

Figure 2:
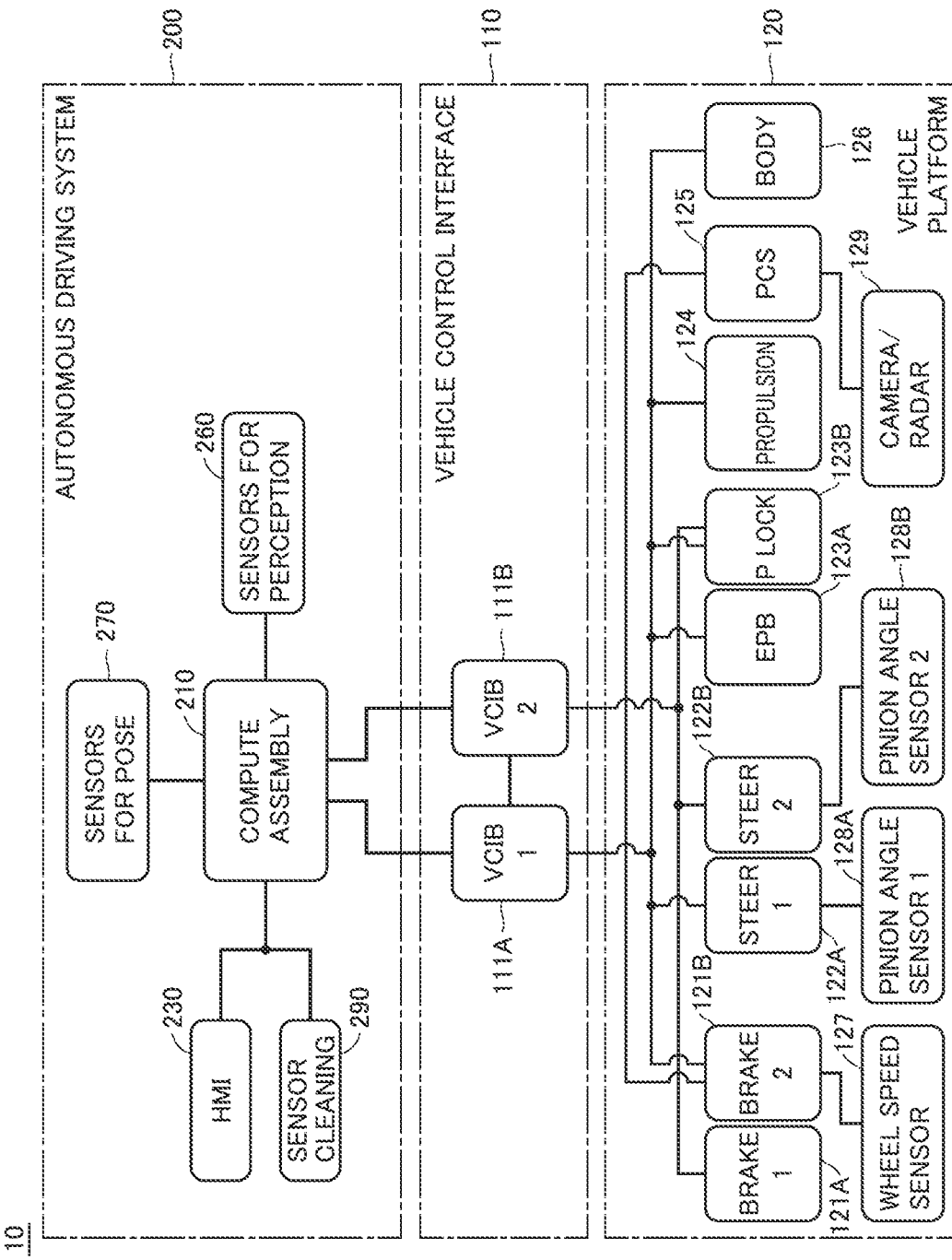
FIG. 2 is a diagram showing a detailed configuration of the vehicle shown in FIG. 1.

FIG. 2 is a diagram showing a detailed configuration of vehicle 10 shown in FIG. 1. Referring to FIG. 2, ADK 200 includes a compute assembly 210, a human machine interface (HMI) system 230, sensors for perception 260, sensors for pose 270, and a sensor cleaning 290.

During autonomous driving of vehicle 10, compute assembly 210 obtains an environment around the vehicle and a pose, a behavior, and a position of vehicle 10 from various sensors which will be described later. Compute assembly 210 obtains a state of vehicle 10 from VP 120 through vehicle control interface 110 and sets a next operation (acceleration, deceleration, or turning) of vehicle 10. Then, compute assembly 210 outputs various commands for realizing a set operation of vehicle 10 to vehicle control interface 110.

HMI system 230 presents information to a user and accepts an operation during autonomous driving, during driving requiring an operation by a user, or at the time of transition between autonomous driving and driving requiring an operation by the user. HMI system 230 includes, for example, a touch panel display, a display apparatus, and an operation apparatus.

Sensors for perception 260 include sensors that perceive an environment around the vehicle, and include, for example, at least any of laser imaging detection and ranging (LIDAR), a millimeter-wave radar, and a camera.

The LIDAR refers to a distance measurement apparatus that measures a distance based on a time period from emission of pulsed laser beams (for example, infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, cut a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 include sensors that detect a pose, a behavior, or a position of vehicle 10, and include, for example, an inertial measurement unit (IMU) or a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 200 removes soiling attached to various sensors. Sensor cleaning 290 removes soiling attached to a lens of the camera or a portion from which laser beams or radio waves are emitted, for example, with a cleaning solution or a wiper.

Vehicle control interface 110 includes vehicle control interface boxes (each of which is denoted as a "VCIB" below) 111A and 111B. Each of VCIBs 111A and 111B includes an ECU, and specifically contains a central processing unit (CPU) and a memory (a read only memory (ROM) and a random access memory (RAM)) (neither of which is shown). Though VCIB 111B is equivalent in function to VCIB 111A, it is partially different in a plurality of systems connected thereto that make up VP 120.

Each of VCIBs 111A and 111B is communicatively connected to compute assembly 210 of ADK 200 over the CAN or the like. VCIB 111A and VCIB 111B are communicatively connected to each other.

VCIBs 111A and 111B relay various commands from ADK 200 and output them as control commands to VP 120. Specifically, VCIBs 111A and 111B convert various commands obtained from ADK 200 in accordance with the API into control commands to be used for control of each system of VP 120 by using information such as a program stored in a memory and output the control commands to a destination system. VCIBs 111A and 111B relay vehicle information output from VP 120 and output the vehicle information as a vehicle state to ADK 200 in accordance with prescribed APIs.

As VCIBs 111A and 111B equivalent in function relating to an operation of at least one of (for example, braking or steering) systems are provided, control systems between ADK 200 and VP 120 are redundant. Thus, when some kind of failure occurs in a part of the system, the function (turning or stopping) of VP 120 can be maintained by switching between the control systems as appropriate or disconnecting a control system where failure has occurred.

VP 120 includes brake systems 121A and 121B, steering systems 122A and 122B, an electric parking brake (EPB) system 123A, a P-Lock system 123B, a propulsion system 124, a pre-crash safety (PCS) system 125, and a body system 126.

VCIB 111A is communicatively connected to brake system 121B, steering system 122A, EPB system 123A, P-Lock system 123B, propulsion system 124, and body system 126 of the plurality of systems included in VP 120, through a communication bus.

VCIB 111B is communicatively connected to brake system 121A, steering system 122B, and P-Lock system 123B of the plurality of systems included in VP 120, through a communication bus.

Brake systems 121A and 121B can control a plurality of braking apparatuses provided in wheels of vehicle 10. Brake system 121B may be equivalent in function to brake system 121A, or one of brake systems 121A and 121B may be able to independently control braking force of each wheel during travel of the vehicle and the other thereof may be able to control braking force such that equal braking force is generated in the wheels during travel of the vehicle. The braking apparatus includes, for example, a disc brake system that is operated with a hydraulic pressure regulated by an actuator.

A wheel speed sensor 127 is connected to brake system 121B. Wheel speed sensor 127 is provided, for example, in each wheel of vehicle 10 and detects a rotation speed of each wheel. Wheel speed sensor 127 outputs the detected rotation speed of each wheel to brake system 121B. Brake system 121B outputs the rotation speed of each wheel to VCIB 111A as one of pieces of information included in vehicle information.

Brake systems 121A and 121B each generate a braking instruction to a braking apparatus in accordance with a prescribed control command received from ADK 200 through vehicle control interface 110. For example, brake systems 121A and 121B control the braking apparatus based on a braking instruction generated in one of brake systems 121A and 121B, and when a failure occurs in one of the brake systems, the braking apparatus is controlled based on a braking instruction generated in the other brake system.

Steering systems 122A and 122B can control a steering angle of a steering wheel of vehicle 10 with a steering apparatus. Steering system 122B is similar in function to steering system 122A. The steering apparatus includes for example, rack-and-pinion electric power steering (EPS) that allows adjustment of a steering angle by an actuator.

A pinion angle sensor 128A is connected to steering system 122A. A pinion angle sensor 128B provided separately from pinion angle sensor 128A is connected to steering system 122B. Each of pinion angle sensors 128A and 128B detects an angle of rotation (a pinion angle) of a pinion gear coupled to a rotation shaft of the actuator. Pinion angle sensors 128A and 128B output detected pinion angles to steering systems 122A and 122B, respectively.

Steering systems 122A and 122B each generate a steering instruction to the steering apparatus in accordance with a prescribed control command received from ADK 200 through vehicle control interface 110. For example, steering systems 122A and 122B control the steering apparatus based on the steering instruction generated in one of steering systems 122A and 122B, and when a failure occurs in one of the steering systems, the steering apparatus is controlled based on a steering instruction generated in the other steering system.

EPB system 123A can control the EPB provided in at least any of wheels of vehicle 10. The EPB is provided separately from the braking apparatus, and fixes a wheel by an operation of an actuator. The EPB, for example, activates a drum brake for a parking brake provided in at least one of wheels of vehicle 10 to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a prescribed control command received from ADK 200 through vehicle control interface 110.

P-Lock system 123B can control a P-Lock apparatus provided in a transmission of vehicle 10. The P-Lock apparatus fixes rotation of an output shaft of the transmission by fitting a protrusion provided at a tip end of a parking lock pawl, a position of which is adjusted by an actuator, into a tooth of a gear locking gear) provided as being coupled to a rotational element in the transmission.

P-Lock system 123B controls the P-Lock apparatus in accordance with a prescribed control command received from ADK 200 through vehicle control interface 110.

Propulsion system 124 can switch a shift range with the use of a shift apparatus and can control driving force of vehicle 10 in a direction of travel that is generated from a drive source. The shift apparatus can select any of a plurality of shift ranges. The drive source includes, for example, a motor generator and an engine.

Propulsion system 124 controls the shift apparatus and the drive source in accordance with a prescribed control command received from ADK 200 through vehicle control interface 110.

PCS system 125 controls vehicle 10 to avoid collision or to mitigate damage by using a camera/radar 129. PCS system 125 is communicatively connected to brake system 121B. PCS system 125 detects an obstacle (an obstacle or a human) in front by using, for example, camera/radar 129, and when it determines that there is possibility of collision based on a distance to the obstacle, it outputs a braking instruction to brake system 121B so as to increase braking force.

Body system 126 can control, for example, components such as a direction indicator, a horn, or a wiper, depending on a state or an environment of travel of vehicle 10. Body system 126 controls each component in accordance with a prescribed control command received from ADK 200 through vehicle control interface 110.

An operation apparatus that can manually be operated by a user for the braking apparatus, the steering apparatus, the EPB, P-Lock, the shift apparatus, and the drive source described above may separately be provided.

Figure 3:
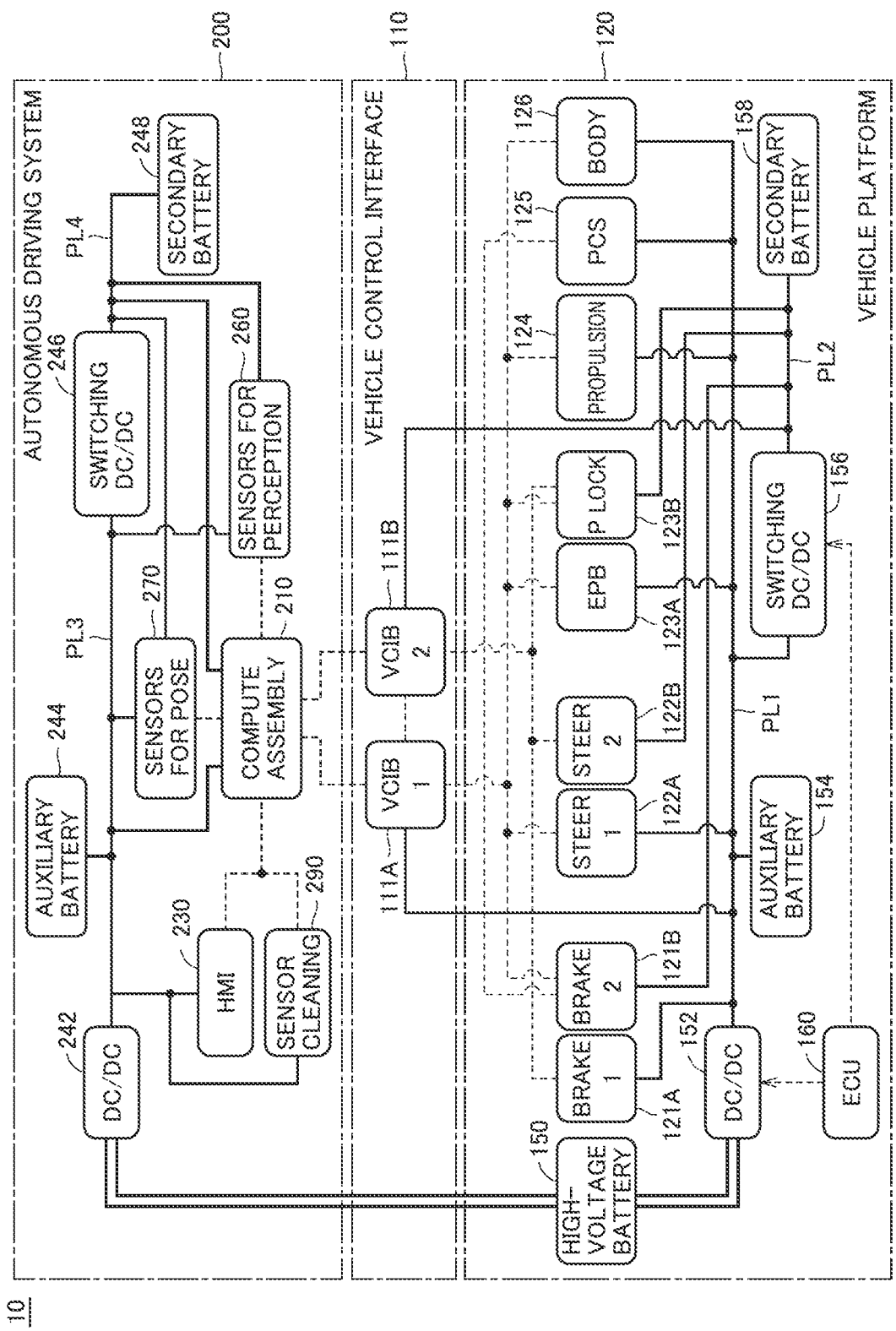
FIG. 3 is a diagram illustrating a configuration of a power supply of the vehicle.

FIG. 3 is a diagram illustrating a configuration of a power supply of vehicle 10. Though FIG. 3 is based on FIG. 2, it does not show wheel speed sensor 127, pinion angle sensors 128A and 128B, and camera radar 129 of VP 120 shown in FIG. 2.

Referring to FIG. 3, VP 120 further includes a high-voltage battery 150, a DC/DC converter 152, an auxiliary battery 154, a switching DC/DC converter 156, a secondary battery 158, and an ECU 160, in addition to each system and each sensor described with reference to FIG. 2.

High-voltage battery 150 includes a plurality of (for example, several hundred) cells. Each cell is, for example, a secondary battery such as a lithium ion battery or a nickel metal hydride battery. High-voltage battery 150 outputs electric power for generating driving force of vehicle 10 to a vehicle drive system (not shown). A voltage of high-voltage battery 150 is, for example, several hundred volts. Instead of high-voltage battery 150, a power storage element such as an electric double layer capacitor may be employed.

DC/DC converter 152 is electrically connected between high-voltage battery 150 and a power line PL1. DC/DC converter 152 down-converts electric power supplied from high-voltage battery 150 to an auxiliary machinery voltage (for example, more than ten volts or several ten volts) lower than the voltage of high-voltage battery 150 and outputs down-converted electric power to power line PL1, in accordance with an instruction from ECU 160. DC/DC converter 152 is implemented, for example, by an isolated DC/DC converter including a transformer.

Auxiliary battery 154 is electrically connected to power line PL1. Auxiliary battery 154 is a chargeable and dischargeable secondary battery, and implemented, for example, by a lead acid battery. Auxiliary battery 154 can store electric power output from DC/DC converter 152 to power line PL1. Auxiliary battery 154 can feed stored electric power to each system electrically connected to power line PL1.

Switching DC/DC converter 156 is electrically connected between power line PL1 and a power line PL2. Switching DC/DC converter 156 supplies electric power from power line PL1 to power line PL2 in accordance with an instruction from ECU 160. When switching DC/DC converter 156 receives a shutdown instruction from ECU 160, it electrically disconnects power line PL2 (secondary battery 158) from power line PL1 by shutting down. Switching DC/DC converter 156 is implemented, for example, by a chopper DC/DC converter that can switch between conduction and disconnection by a semiconductor switching element.

Secondary battery 158 is electrically connected to power line PL2. Secondary battery 158 is a chargeable and dischargeable secondary battery, and implemented, for example, by a lithium ion secondary battery. Secondary battery 158 can store electric power output from switching DC/DC converter 156 to power line PL2. Secondary battery 158 can supply stored electric power to each system electrically connected to power line PL2.

DC/DC converter 152 and auxiliary battery 154 implement a primary power supply system of VP 120. Drake system 121A, steering system 122A, EPB system 123A, propulsion system 124, PCS system 125, body system 126, and VCIB 111A are electrically connected to power line PL1 which is a power supply line of the primary power supply system, and these systems receive supply of electric power from the primary power supply system.

Switching DC/DC converter 156 and secondary battery 158 implement a secondary power supply system of VP 120. Brake system 121B, steering system 122B, P-Lock system 123B, and VCIB 111B are electrically connected to power line PL2 which is a power supply line of the secondary power supply system, and these systems receive supply of electric power from the secondary power supply system.

The secondary power supply system constituted of switching DC/DC converter 156 and secondary battery 158 functions as a redundant power supply for the primary power supply system constituted of DC/DC converter 152 and auxiliary battery 154. When a power feed function of the primary power supply system fails and power cannot be fed to each system connected to power line PL1, the secondary power supply system continues power feed to each system connected to power line PL2 at least for a certain period of time such that the function of VP 120 is not immediately completely lost.

More specifically, for example, when failure of the power feed function of the primary power supply system is detected due to abnormal lowering in voltage of power line PL1, switching DC/DC converter 156 shuts down to electrically disconnect secondary battery 158 from the primary power supply system, and power feed from secondary battery 158 to each system connected to power line PL2 is continued. A capacity of secondary battery 158 is designed such that power can be fed from secondary battery 158 at least for a certain period of time after shutdown of switching DC/DC converter 156.

If it is assumed that power feed from the secondary power supply system (secondary battery 158) to all systems is continued in case of failure of the power feed function of the primary power supply system, secondary battery 158 of a large capacity should be prepared or a time period for which power feed from secondary battery 158 is continued should be made shorter. In the embodiment, a system that receives supply of electric power from the secondary power supply system (secondary battery 158) is limited to brake system 121B, steering system 122B, P-Lock system 123B, and VCIB 111B. Therefore, the capacity of secondary battery 158 can be suppressed and power feed to the limited systems can be continued at least for a certain period of time.

ECU 160 includes a CPU, a memory (a ROM and a RAM), and an input and output buffer (none of which is shown). The CPU executes a program stored in the ROM by developing the program on the RAM. Processing performed by the ECU is described in the program stored in the ROM.

ECU 160 generates an instruction for driving DC/DC converter 152 and provides the instruction to DC/DC converter 152 while VP 120 is on (during Ready-ON). ECU 160 may generate an instruction for driving DC/DC converter 152 when a voltage of power line PL1 (auxiliary battery 154) has lowered, without constantly generating the instruction.

ECU 160 generates an instruction for driving switching DC/DC converter 156 and provides the instruction to switching DC/DC converter 156 while VP 120 is on. For switching DC/DC converter 156 as well, ECU 160 may generate an instruction for driving switching DC/DC converter 156 when a voltage of power line PL2 (secondary battery 158) has lowered, without constantly generating the instruction.

ECU 160 detects a failure of the power feed function of the primary power supply system constituted of DC/DC converter 152 and auxiliary battery 154, for example, based on a voltage of auxiliary battery 154 or power line PL1. When ECU 160 detects a failure of the power feed function of the primary power supply system, ECU 160 provides a shutdown instruction to switching DC/DC converter 156. Switching DC/DC converter 156 thus shuts down to electrically disconnect secondary battery 158 from the primary power supply system.

In vehicle 10 according to the present embodiment, the power supply structure for ADK 200 (ADS) is designed independently of the power supply structure for VP 120. Specifically, ADK 200 further includes a DC/DC converter 242, an auxiliary battery 244, a switching DC/DC converter 246, and a secondary battery 248 in addition to the systems and the sensors described with reference to FIG. 2.

DC/DC converter 242 is electrically connected between high-voltage battery 150 of VP 120 and a power line PL3. DC/DC converter 242 and high-voltage battery 150 are electrically connected to each other through a not-shown power terminal. DC/DC converter 242 down-converts electric power supplied from high-voltage battery 150 to an auxiliary machinery voltage lower than the voltage of high-voltage battery 150 and provides the down-converted auxiliary machinery voltage to power line PL3 in accordance with an instruction from compute assembly 210. DC/DC converter 242 is implemented, for example, by an isolated DC/DC converter including a transformer.

Auxiliary battery 244 is electrically connected to power line PL3. Auxiliary battery 244 is a chargeable and dischargeable secondary battery, and implemented, for example, by a lead acid battery. Auxiliary battery 244 can store electric power output from DC/DC converter 242 to power line PL3. Auxiliary battery 244 can feed stored electric power to each system electrically connected to power line PL3.

Switching DC/DC converter 240 is electrically connected between power line PL3 and a power line PL4. Switching DC/DC converter 246 supplies electric power from power line PL3 to power line PL4 in accordance with an instruction from compute assembly 210. When switching DC/DC converter 246 receives a shutdown instruction from compute assembly 210, it shuts down to electrically disconnect power line PL4 (secondary battery 248) from power line PL3.

Switching DC/DC converter 246 is implemented, for example, by a chopper DC/DC converter that can switch between conduction and disconnection by a semiconductor switching element.

Secondary battery 248 is electrically connected to power line PL4. Secondary battery 248 is a chargeable and dischargeable secondary battery and implemented, for example, by a lithium ion secondary battery. Secondary battery 248 can store electric power output from switching DC/DC converter 246 to power line PL4. Secondary battery 248 can supply stored electric power to each system electrically connected to power line PL4.

DC/DC converter 242 and auxiliary battery 244 implement the primary power supply system of ADK 200 (ADS). Compute assembly 210, sensors for perception 260, sensors for pose 270, HMI system 230, and sensor cleaning 290 are electrically connected to power line PL3 which is a power supply line of the primary power supply system, and each system receives supply of electric power front the primary power supply system.

Switching DC/DC converter 246 and secondary battery 248 implement the secondary power supply system of ADK 200 (ADS). Compute assembly 210, sensors for perception 260, and sensors for pose 270 are electrically connected to power line PL4 which is a power supply line of the secondary power supply system, and each system can receive power feed also from the secondary power supply system.

The secondary power supply system constituted of switching DC/DC converter 246 and secondary battery 248 functions as a redundant power supply for the primary power supply system constituted of DC/DC converter 242 and auxiliary battery 244. When a power feed function of the primary power supply system fails and power cannot be fed to each system connected to power line PL3, the secondary power supply system keeps feeding power to each system connected to power line PL4 such that the function of ADK 200 is not immediately completely lost.

More specifically, when a failure of the power feed function of the primary power supply system is detected, for example, due to abnormal lowering in voltage of power line PL3, switching DC/DC converter 246 shuts down to electrically disconnect secondary battery 248 from the primary power supply system and power feed from secondary battery 248 to each system connected to power line PL4 is kept.

Thus, in vehicle 10 according to the present embodiment, the power supply of ADK 200 (ADS) is independent of the power supply of VP 120. Therefore, when a failure occurs in the power supply of ADK 200, the power supply of VP 120 is not affected by the failure of the power supply of ADK 200. Therefore, high reliability of the power supply of VP 120 is ensured.

In vehicle 10 according to the present embodiment, the redundant power supply (the secondary power supply system) is also provided in each of ADK 200 and VP 120 independently of each other. Thus, when the power feed function of the primary power supply system fails and power feed by the secondary power supply system (redundant power supply) is carried out in ADK 200, the secondary power supply system (redundant power supply) of VP 120 is not affected thereby. Therefore, high reliability also of the redundant power supply can be ensured.

Figure 4:
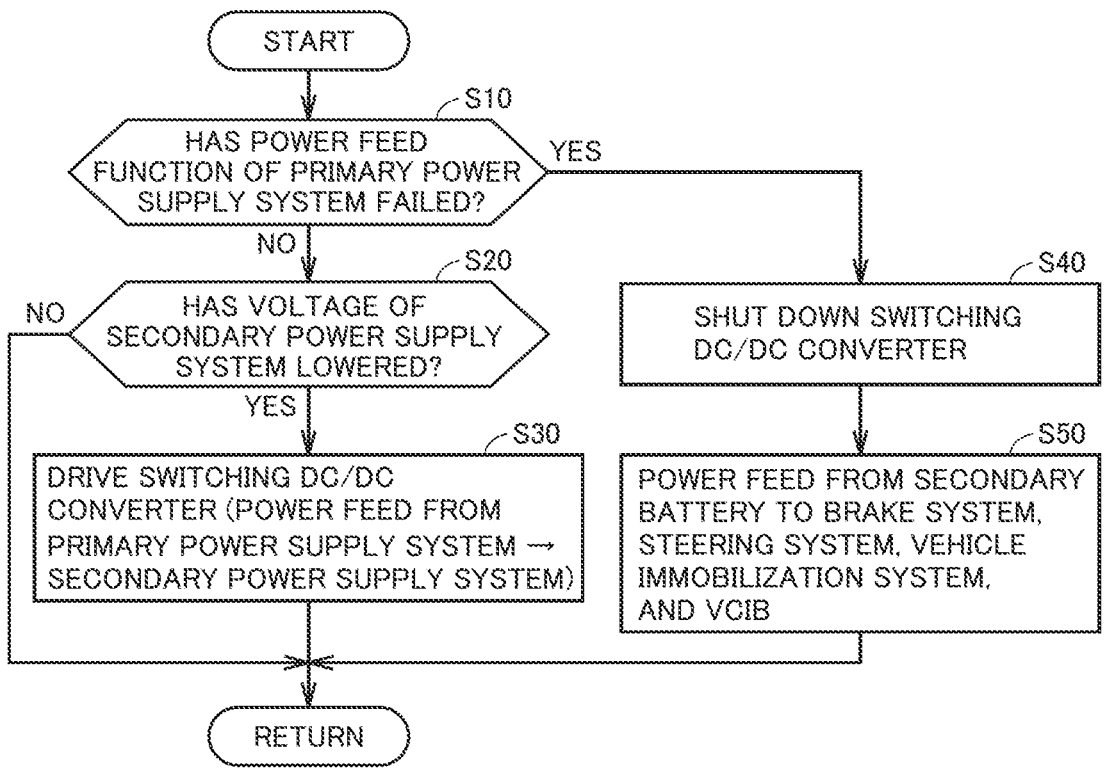
FIG. 4 is a flowchart illustrating an operation by a switching DC/DC converter of a VP.

FIG. 4 is a flowchart illustrating an operation by switching DC/DC converter 156 of VP 120. This flowchart is repeatedly performed with prescribed cycles. A series of processing shown in this flowchart is performed at least in an autonomous driving mode in which autonomous driving of vehicle 10 is carried out by ADK 200.

Referring to FIG. 4, ECU 160 determines whether or not the power feed function of the primary power supply system constituted of DC/DC converter 152 and auxiliary battery 154 has failed (step S10). For example, when the voltage of power line PL1 has abnormally lowered, the power feed function of the primary power supply system is determined as having failed.

When the power feed function of the primary power supply system is determined as being normal (NO in step S10). ECU 160 determines whether or not the voltage of the secondary power supply system constituted of switching DC/DC converter 156 and secondary battery 158 has lowered (step S20). For example, when the voltage of power line PL2 has lowered to a lower limit of a normal range, the voltage of the secondary power supply system is determined as having lowered.

When the voltage of the secondary power supply system is determined as having lowered (YES in step S20), ECU 160 generates an instruction for driving switching DC/DC converter 156 and provides the instruction to switching DC/DC converter 156 (step S30). Switching DC/DC converter 156 is thus activated and electric power is supplied from the primary power supply system to the secondary power supply system (from power line PL1 to power line PL2).

Though switching DC/DC converter 156 is driven when the voltage of the secondary power supply system has lowered in this example, DC/DC converter 156 may constantly be driven by adjusting an output from switching DC/DC converter 156 in accordance with the voltage of the secondary power supply system.

When the power feed function of the primary power supply system is determined in step S10 as having failed (YES in step S10), ECU 160 generates an instruction to shut down switching DC/DC convertor 156 and provides the instruction to switching DC/DC converter 156 (step S40). Thus, secondary battery 158 is disconnected from the primary power supply system, and power feed from secondary battery 158 to brake system 121B, steering system 122B. P-Lock system 123B, and VCIB 111B connected to the secondary power supply system (power line PL2) is kept (step S50).

As set forth above, in this embodiment, the power supply of ADK 200 (ADS) is independent of the power supply of VP 120. Therefore, when a failure occurs in the power supply of ADK 200, the power supply of VP 120 is not affected by the failure of the power supply of ADK 200. Therefore, according to this embodiment, reliability of the power supply of VP 120 can be ensured.

In this embodiment, the secondary power supply system as the redundant power supply is provided in each of the power supply of VP 120 and the power supply of ADK 200, and the redundant power supply is provided in each of ADK 200 and VP 120 independently of each other. Thus, for example, when the power feed function of the primary power supply system fails and power feed by the secondary power supply system (redundant power supply) is carried out in ADK 200, the secondary power supply system (redundant power supply) of VP 120 is not affected thereby. Therefore, according to this embodiment, reliability also of the redundant power supply can be ensured.

According to this embodiment, when the power feed function of the primary power supply system fails in VP 120, the system to which power feed from the secondary power supply system (secondary battery 158) is kept is limited. Therefore, power feed for a certain time period from the secondary power supply system can be kept By limiting the system to brake system 121B, steering system 122B, and P-Lock system 123B, at least the steering function and the stand still function of vehicle 10 can be ensured. Since power feed from the secondary power supply system to VCIB 111B is also kept, interfacing between VP 120 and ADK 200 is also continued.

In the embodiment, on VP 120, when the power feed function of the primary power supply system fails, switching DC/DC converter 156 electrically disconnects secondary battery 158 from the primary power supply system. Thus, when the power feed function of the primary power supply system fails, secondary battery 158 can be disconnected from the primary power supply system in a shorter period of time than by means of a mechanical relay apparatus. Therefore, according to this embodiment, influence onto the secondary power supply system in case of a failure of the power feed function of the primary power supply system can be suppressed.

Example 1

Toyota's MaaS Vehicle Platform
API Specification
for ADS Developers
[Standard Edition #0.1]

History of Revision

TABLE 1

| Date of Revision | ver. | Summary of Revision | Reviser |
| --- | --- | --- | --- |
| 2019 May 4 | 0.1 | Creating a new material | MaaS Business Div. |

Index
1. Outline 4
1.1. Purpose of this Specification 4
1.2. Target Vehicle 4
1.3. Definition of Term 4
1.4 Precaution for Handling 4
2. Structure 5
2.1. Overall Structure of MaaS 5
2.2. System structure of MaaS vehicle 6
3. Application Interfaces 7
3.1. Responsibility sharing of when using APIs 7
3.2. Typical usage of APIs 7
3.3. APIs for vehicle motion control 9
   3.3.1. Functions 9
   3.3.2. Inputs 16
   3.3.3. Outputs 23
3.4. APIs for BODY control 45
   3.4.1. Functions 45
   3.4.2. Inputs 45
   3.4.3. Outputs 56
3.5. APIs for Power control 68
   3.5.1. Functions 68
   3.5.2. Inputs 68
   3.5.3. Outputs 69
3.6. APIs for Safety 70
   3.6.1. Functions 70
   3.6.2. Inputs 70
   3.6.3. Outputs 70
3.7. APIs for Security 74
   3.7.1. Functions 74
   3.7.2. Inputs 74
   3.7.3. Outputs 76
3.8 APIs for MaaS Service 80
   3.8.1. Functions 80
   3.8.2. Inputs 80
   3.8.3. Outputs 80

1. Outline 1.1. Purpose of this Specification

This document is an API specification of Toyota Vehicle Platform and contains the outline, the usage and the caveats of the application interface.

1.2. Target Vehicle e-Palette, MaaS vehicle based on the POV (Privately Owned Vehicle) manufactured by Toyota 1.3. Definition of Term

TABLE 2

| Term | Definition |
| --- | --- |
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change Such changes are notified to the users. Please note that some parts are still T.B.D. will be updated in the future.

2. Structure 2.1. Overall Structure of MaaS

Figure 5:
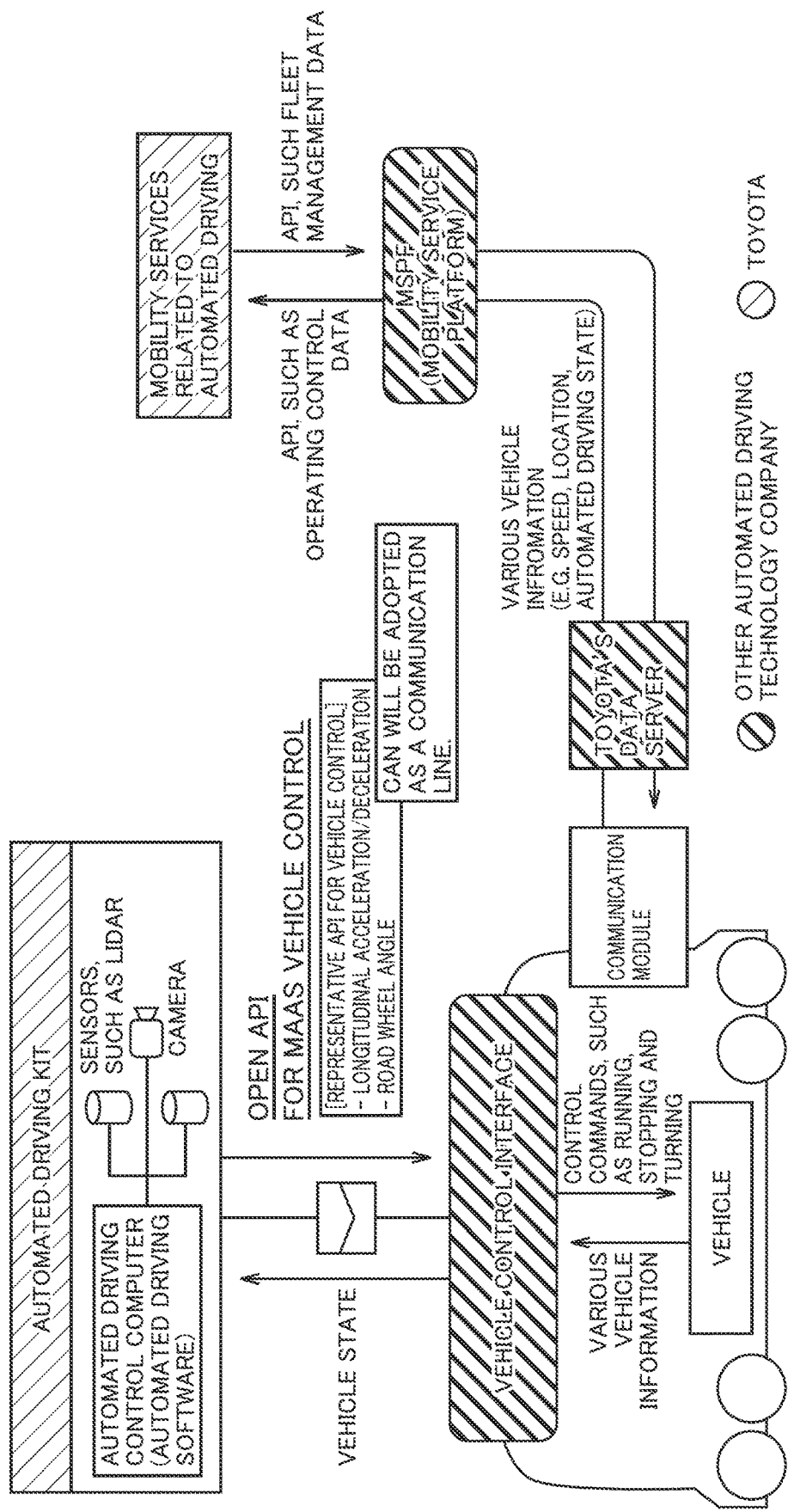
FIG. 5 is a diagram of an overall configuration of MaaS.

The overall structure of MaaS with the target vehicle is shown (FIG. 5).
Vehicle control technology is being used as an interface for technology providers.
Technology providers can receive open API such as vehicle state and vehicle control, necessary for development of automated driving systems.

2.2. System Structure of MaaS Vehicle

Figure 6:
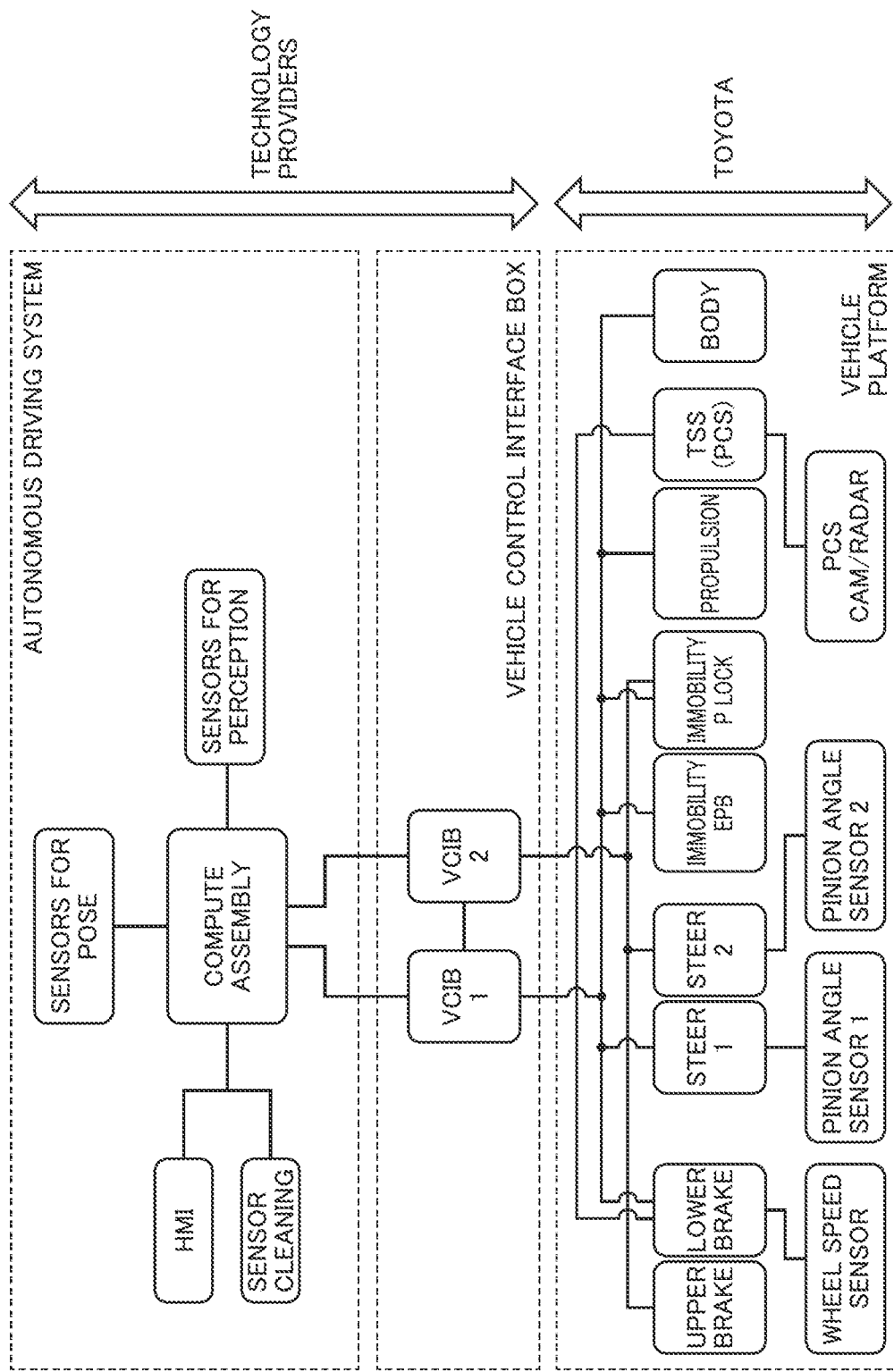
FIG. 6 is a diagram of a system configuration of a MaaS vehicle.

The system architecture as a premise is shown (FIG. 6).
The target vehicle will adopt the physical architecture of using CAN for the bus between ADS and VCIB. In order to realize each API in this document, the CAN frames and the bit assignments are shown in the form of "bit assignment table" as a separate document.

3. Application Interfaces 3.1 Responsibility Sharing of when Using APIs

Basic responsibility sharing between ADS and vehicle VP is as follows when using APIs.

[ADS]

The ADS should create the driving plan, and should indicate vehicle control values to the VP.

[VP]

The Toyota VP should control each system of the VP based on indications from an ADS.

3.2. Typical Usage of APIs

In this section, typical usage of APIs is described.

CAN will be adopted as a communication line between ADS and VP. Therefore, basically. APIs should be executed every defined cycle time of each API by ADS.

A typical workflow of ADS of when executing APIs is as follows (FIG. 7).

3.3. APIs for Vehicle Motion Control

In this section, the APIs for vehicle motion control which is controllable in the MaaS vehicle is described.

3.3.1. Functions

3.3.1.1 Standstill, Start Sequence

The transition to the standstill (immobility) mode and the vehicle start sequence are described. This function presupposes the vehicle is in Autonomy_State=Autonomous Mode. The request is rejected in other modes.

The below diagram shows an example.

Acceleration Command requests deceleration and stops the vehicle. Then, when Longitudinal_Velocity is confirmed as 0 [km/h]. Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

Figure 8:
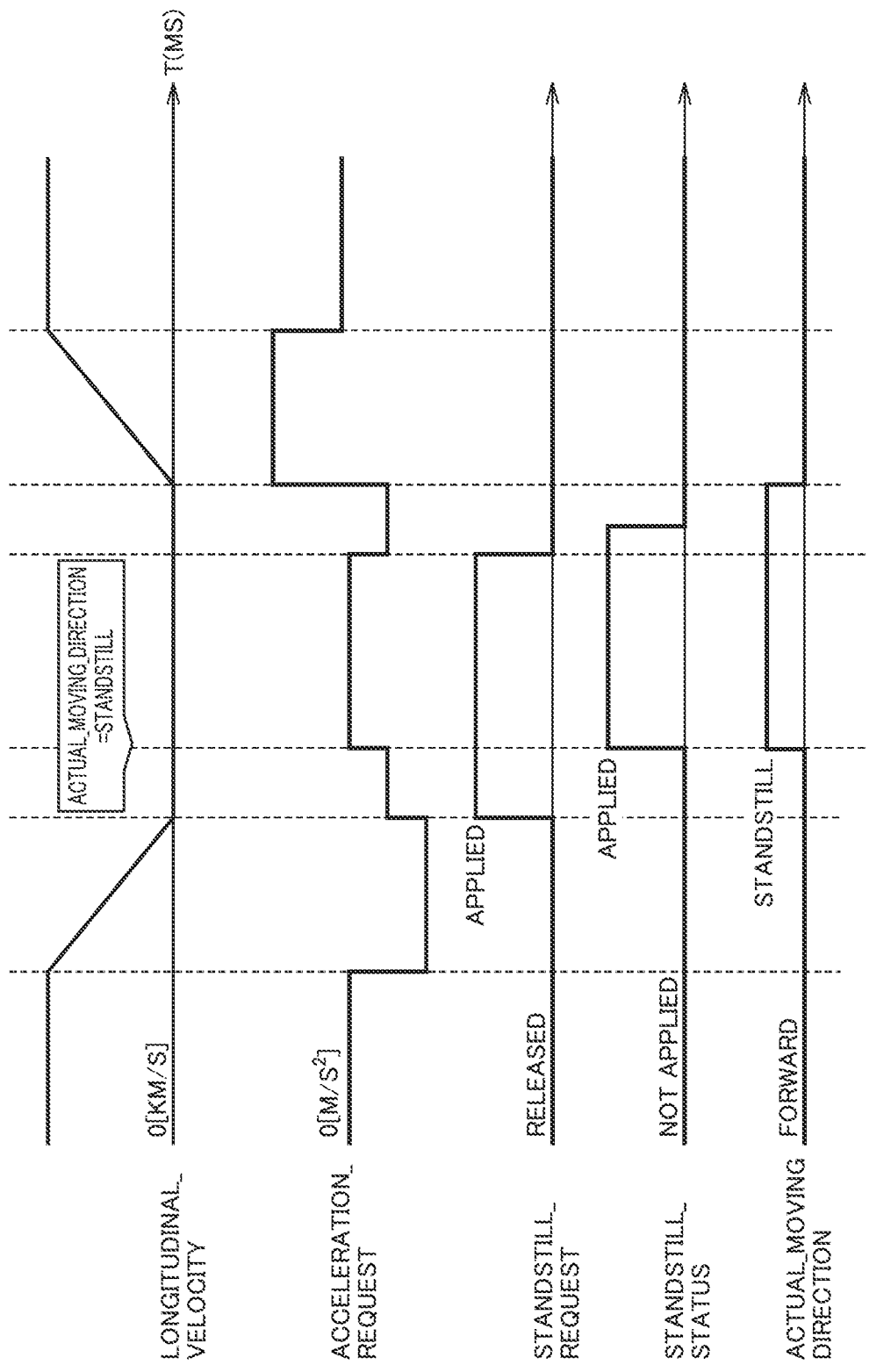
FIG. 8 is a diagram showing an exemplary timing chart of an API relating to stop and start of the MaaS vehicle.

If the vehicle needs to start, the brake hold control is cancelled by setting Standstill Command to "Released". At the same time, acceleration/deceleration is controlled based on Acceleration Command (FIG. 8).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change. Acceleration Command has to request deceleration.

Figure 9:
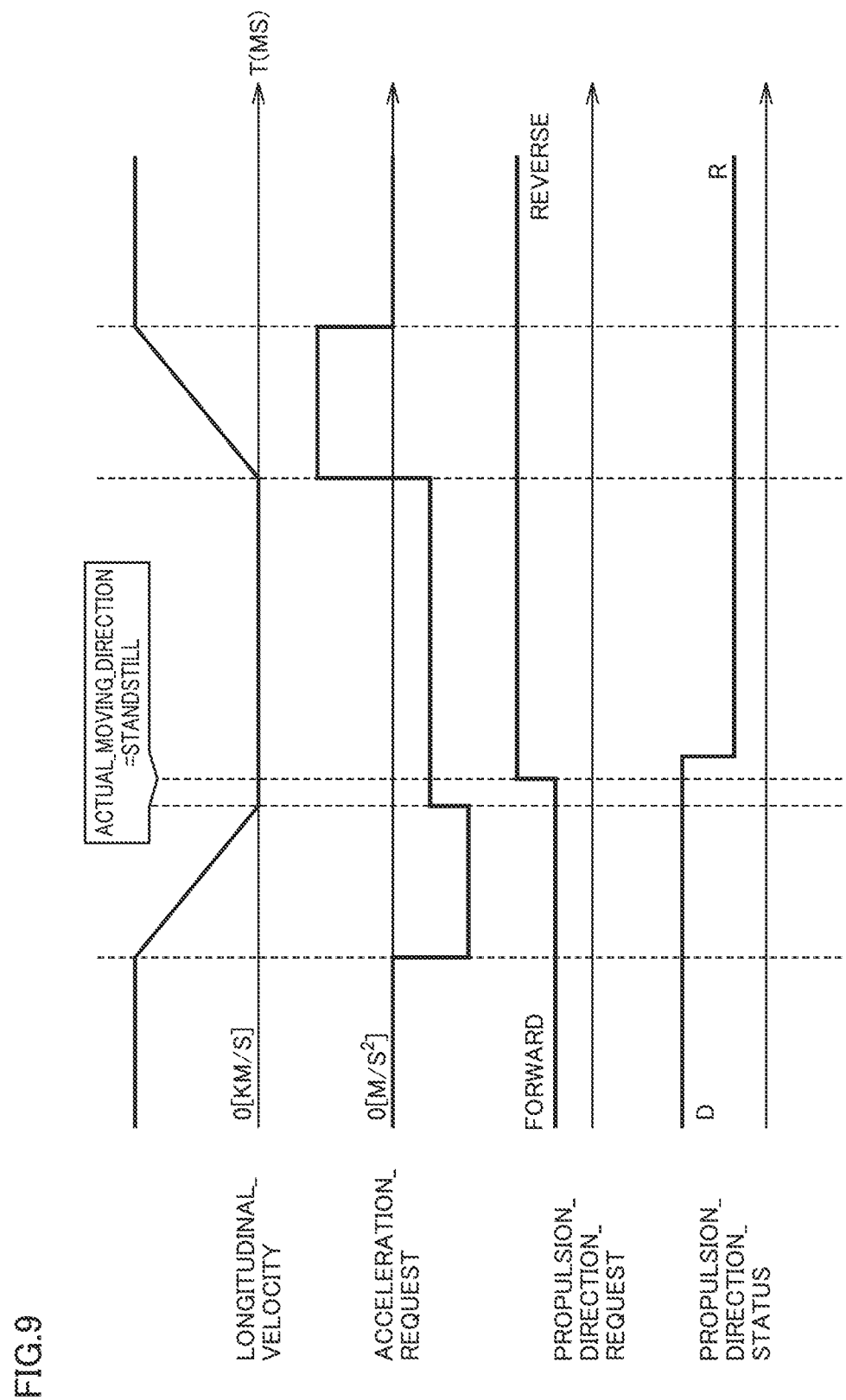
FIG. 9 is a diagram showing an exemplary timing chart of the API relating to shift change of the MaaS vehicle.

After the shift change, acceleration deceleration is controlled based on Acceleration Command value (FIG. 9).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle step. After Actual_Moving_Direction is set to "standstill", WheelLock is engaged by Immobilization Command="Applied". Acceleration Command is set to Deceleration until Immobilization Status is set to "Applied".

If release is desired, immobilization Command="Release" is requested when the vehicle is stationary. Acceleration Command is set to Deceleration at that time.

Figure 10:
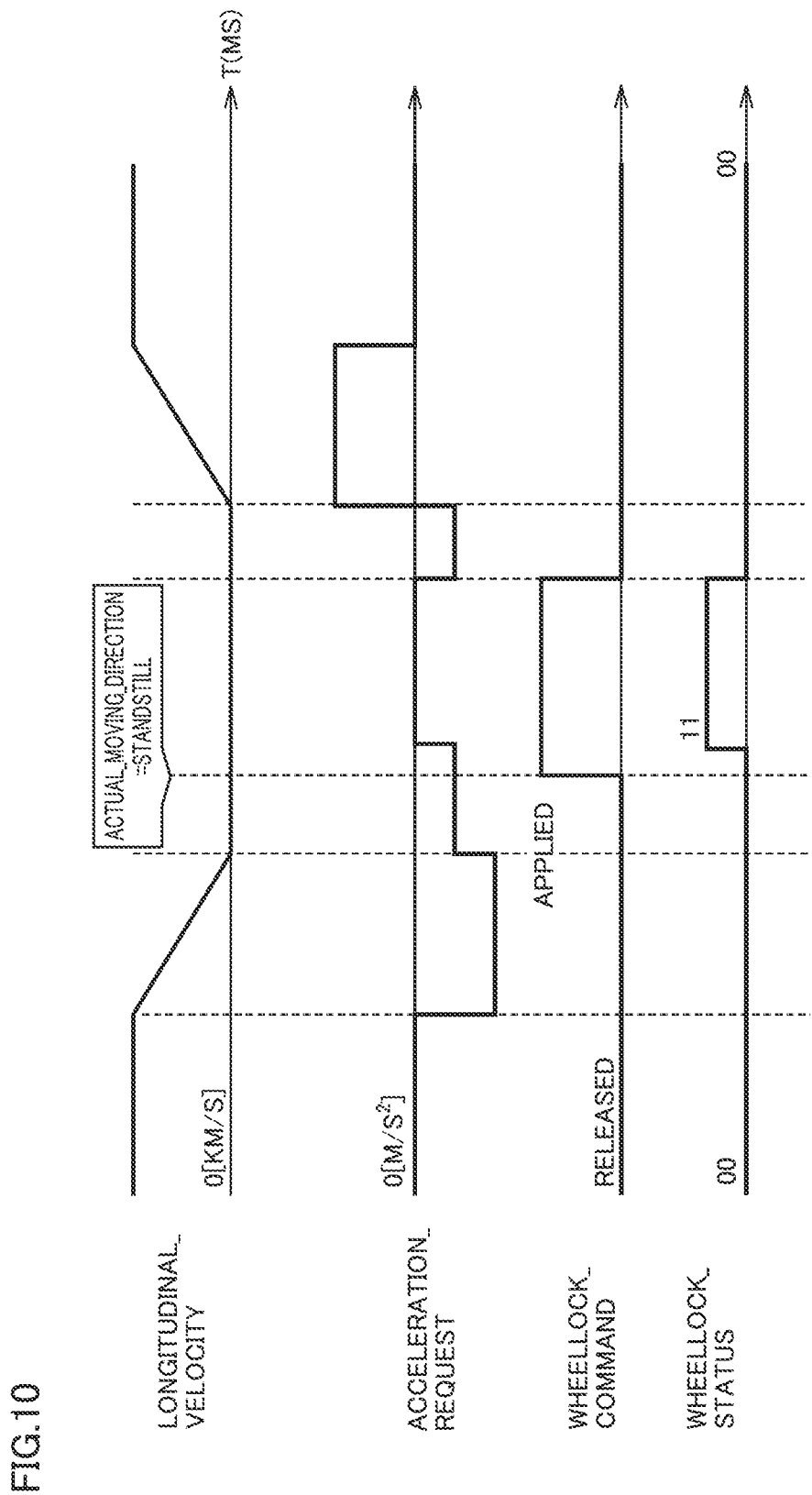
FIG. 10 is a diagram showing an exemplary timing chart of the API relating to wheel lock of the MaaS vehicle.

After this, the vehicle is accelerated decelerated based on Acceleration Command value (FIG. 10).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight.

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1 Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shirt position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
| --- | --- | --- |
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
| --- | --- | --- |
| 0 | No Request | |
| 2 | R | Shift to R range |
| 4 | D | Shift to D range |
| other | Reserved | |

Remarks

Only available when Autonomy_State="Autonomous Mode"
D/R is changeable only the vehicle is stationary (Actual_Moving_Direction="standstill").
The request while driving (moving) is rejected.
When system requests D/R shifting. Acceleration Command is sent deceleration (−0.4 m/s$^2$) simultaneously. (Only while brake is applied.)
The request may not be accepted in following cases.
Direction_Control_Degradation_Modes="Failure detected"

3.3.2.2. Immobilization Command

Request to engage/release WheelLock

Values

TABLE 5

| value | Description | Remarks |
| --- | --- | --- |
| 0 | No Request | |
| 1 | Applied | EPB is turned on and TM shifts to P range |
| 2 | Released | EPB is turned off and TM shifts to the value of Propulsion Direction Command |

Remarks

Available only when Autonomy_State="Autonomous Mode"
Changeable only when the vehicle is stationary (Actual_Moving_Direction="standstill")
The request is rejected when vehicle is running.
When Apply Release mode change is requested, Acceleration Command is set to deceleration (−0.4 m/s$^2$). (Only while brake is applied.)

3.3.2.3. Standstill Command

Request the vehicle to be stationary

Values

TABLE 6

| value | Description | Remarks |
| --- | --- | --- |
| 0 | No Request | |
| 1 | Applied | Standstill is requested |
| 2 | Released | |

Remarks

Only available when Autonomy_State="Autonomous Mode"
Confirmed by Standstill Status="Applied"
When the vehicle is stationary (Actual_Moving_Direction="standstill"), transition to Stand Still is enabled.
Acceleration Command has to be continued until Standstill Status becomes "Applied" and Acceleration Command's deceleration request (−0.4 m/s$^2$) should be continued.
There are more cases where the request is not accepted. Details are T.B.D.

3.3.2.4. Acceleration Command

Command vehicle acceleration

Values

Estimated_Max_Decel_Capability to Estimated_Max_Accel_Capability [m/s$^2$]

Remarks

Only available when Autonomy_State="Autonomous Mode"
Acceleration (+) and deceleration (−) request based on Propulsion Direction Status direction
The upper lower limit will vary based on Estimated_Max_Decel_Capability and Estimated_Max_Accel_Capability.

When acceleration more than Estimated_Max_Accel_Capability is requested, the request is set to Estimated_Max_Accel_Capability.

When deceleration more than Estimated_Max_Decel_Capability is requested, the request is set to Estimated_Max_Decel_Capability.

Depending on the accel/brake pedal stroke, the requested acceleration may not be met. See 3.4.1.4 for more detail.

When Pre-Collision system is activated simultaneously, minimum acceleration (maximum deceleration) is selected.

3.3.2.5. Tire Turning Angle Command

Command tire turning angle

Values

TABLE 7

| value | Description | Remarks |
|---|---|---|
| — | [unit: rad] | |

Remarks

Left is positive value (+). Right is negative value (−).
Available only when Autonomy_State="Autonomous Mode"
The output of Estimated_Road_Wheel_Angle_Actual when the vehicle is going straight, is set to the reference value (0).

This requests relative value of Estimated_Road_Wheel_Angle_Actual. (See 3.4.1.1 for details)

The requested value is within Current_Road_Wheel_Angle_Rate_Limit.

The requested value may not be fulfilled depending on the steer angle by the driver.

3.3.2.6. Autonomization Command

Request to transition between manual mode and autonomy mode

Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |

TABLE 9-continued

| Signal Name | Description | Redundancy |
|---|---|---|
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current shift range

Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".
When the vehicle becomes the following status during VO mode. [Propulsion Direction Status] will turn to "P".
[Longitudinal_Velocity]=0 [km/h]
[Brake_Pedal_Position]<Threshold value (T.B.D.) (in case of being determined that the pedal isn't depressed)
[1st_Left_Seat_Belt_Status]=Unbuckled
[1st_Left_Door_Open_Status]=Opened

3.3.3.2. Propulsion Direction by Driver

Shift lever position by driver operation

Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver
If the driver releases his hand of the shift lever, the lever returns to the central position and the output is set as "No Request".
When the vehicle becomes the following status during NVO mode, [Propulsion Direction by Driver] will turn to "1(P)".
[Longitudinal_Velocity]=0 [km/h]
[Brake_Pedal_Position]<Threshold value (T.B.D.) (in case of being determined that the pedal isn't depressed)
[1st_Left_Seat_Belt_Status]=Unbuckled
[1st_Left_Door_Open_Status]=Opened

3.3.3.3. Immobilization Status

Output EPB and Shift-P status

Values

Primary

TABLE 12

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Secondary

TABLE 13

| Value | Description | Remarks |
|---|---|---|
| Shift | | |
| 0 | 0 | Other than Shift P | |
| 1 | 0 | Shift P | |
| 0 | 1 | Reserved | |
| 1 | 1 | Reserved | |

Remarks

Secondary signal does not include EPB lock status.

3.3.3.4. Immobilization Request by Driver

Driver operation of EPB switch

Values

TABLE 14

| value | Description | remarks |
|---|---|---|
| 0 | No Request | |
| 1 | Engaged | |
| 2 | Released | |
| 3 | Invalid value | |

Remarks

"Engaged" is outputted while the EPB switch is being pressed.
"Released" is outputted while the EPB switch is being pulled.

3.3.3.5. Standstill Status

Vehicle stationary status

Values

TABLE 15

| Value | Description | remarks |
|---|---|---|
| 0 | Released | |
| 1 | Applied | |
| 2 | Reserved | |
| 3 | Invalid value | |

Remarks

When Standstill Status=Applied continues for 3 minutes, EPB is activated.
If the vehicle is desired to start. ADS requests Standstill Command="Released".

3.3.3.6. Estimated_Coasting_Rate

Estimated vehicle deceleration when throttle is closed

Values

[unit: m/s$^2$]

Remarks

Estimated acceleration at WOT is calculated.
Slope and road load etc. are taken into estimation.
When the Propulsion Direction Status is "D", the acceleration to the forward direction shows a positive value.
When the Propulsion Direction Status is "R", the acceleration to the reverse direction shows a positive value.

3.3.3.7. Estimated_Max_Accel_Capability

Estimated maximum acceleration

Values

[unit: m/s$^2$]

Remarks

The acceleration at WOT is calculated.
Slope and road load etc. are taken into estimation.
The direction decided by the shift position is considered to be plus.

3.3.3.8. Estimated_Max_Decel_Capability

Estimated maximum deceleration

Values

−9.8 to 0 [unit: m/s$^2$]

Remarks

Affected by Brake_System_Degradation_Modes. Details are T.B.D.
Based on vehicle slate or road condition, cannot output in some cases

3.3.3.9. Estimated_Road_Wheel_Angle_Actual

Front wheel steer angle

Values

TABLE 16

| value | Description | Remarks |
|---|---|---|
| others | [unit: rad] | |
| Minimum Value | Invalid value | The sensor is invalid. |

Remarks

Left is positive value (+). Right is negative value (−).
Before "the wheel angle when the vehicle is going straight" becomes available, this signal is Invalid value.

3.3.3.10. Estimated_Road_Wheel_Angle_Rate_Actual

Front wheel steer angle rate

Values

TABLE 17

| value | Description | Remarks |
|---|---|---|
| others | [unit: rad/s] | |
| Minimum Value | Invalid value | |

Remarks

Left is positive value (+). Right is negative value (−).

3.3.3.11. Steering_Wheel_Angle_Actual

Steering wheel angle

Values

TABLE 18

| Value | Description | Remarks |
|---|---|---|
| others | [unit: rad] | |
| Minimum Value | Invalid value | |

Remarks

Left is positive value (+). Right is negative value (−).
The steering angle converted from the steering assist motor angle
Before "the wheel angle when the vehicle is going straight" becomes available, this signal is Invalid value.

3.3.3.12. Steering_Wheel_Angle_Rate_Actual

Steering wheel angle rate

Values

TABLE 19

| Value | Description | Remarks |
|---|---|---|
| others | [unit: rad/s] | |
| Minimum Value | Invalid value | |

Remarks

Left is positive value (+). Right is negative value (−).
The steering angle rate converted from the steering assist motor angle rate

3.3.3.13. Current_Road_Wheel_Angle_Rate_Limit

Road wheel angle rate limit

Values

When stopped: 0.4 [rad/s]
While running: Show "Remarks"

Remarks

Figure 11:
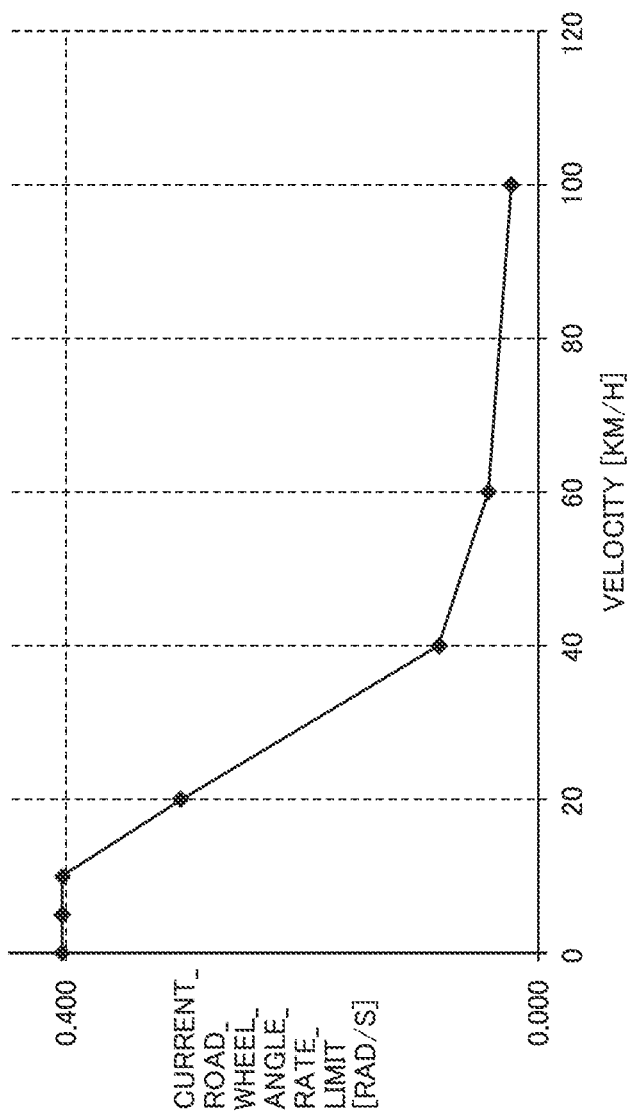
FIG. 11 is a diagram showing a limit value of variation in tire turning angle.

Calculated from the "vehicle speed–steering angle rate" chart like below
A) At a very low speed or stopped situation, use fixed value of 0.4 [rad/s]
B) At a higher speed, the steering angle rate is calculated from the vehicle speed using 2.94 m/s$^3$ The threshold speed between A and B is 10 [km/h] (FIG. 11).

3.3.3.14. Estimated_Max_Lateral_Acceleration_Capability

Estimated max lateral acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated max lateral acceleration rate

Values 2.94 [unit: m/s$^3$] fixed value

Remarks

Wheel Angle controller is designed within the acceleration range up to 2.94 in m/s$^3$.

3.3.3.16. Accelerator_Pedal_Position

Position of the accelerator pedal (How much is the pedal depressed?)

Values 0 to 100 [unit: %]

Remarks

In order not to change the accelerator, openness suddenly, this signal is filtered by smoothing process.
In normal condition
  The accelerator position signal after zero point calibration is transmitted.
In failure condition
  Transmitted failsafe value (0xFF)

3.3.3.17. Accelerator_Pedal_Intervention

This signal shows whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal will not turn to "2".

Figure 12:
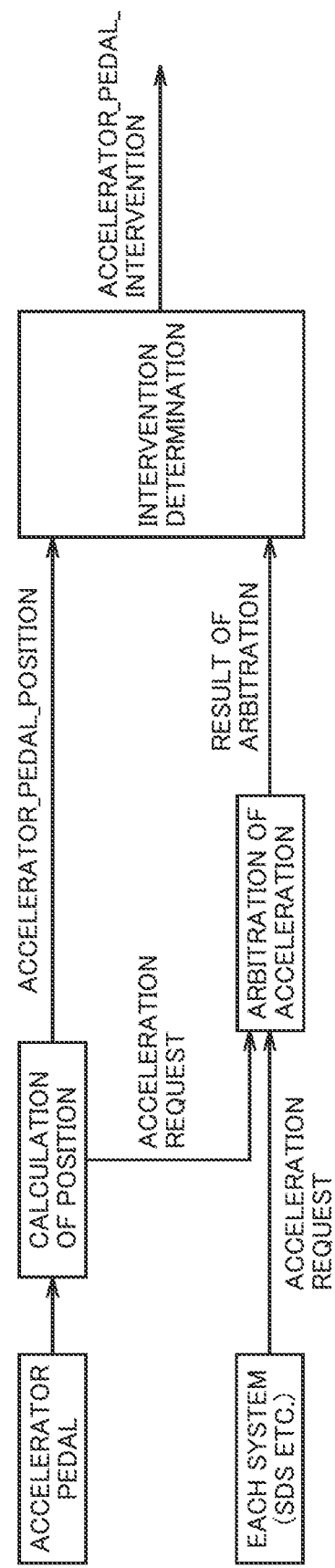
FIG. 12 is a diagram illustrating intervention by an accelerator pedal.

Detail design (FIG. 12)

3.3.3.18. Brake_Pedal_Position

Position of the brake pedal (How much is the pedal depressed?)

Values 0 to 100 [unit: %]

Remarks

In the brake pedal position sensor failure:
Transmitted failsafe value (0xFF)
Due to assembling error, this value might be beyond 100%.

3.3.3.19. Brake_Pedal_Intervention

This signal shows whether the brake pedal is depressed by a driver (intervention).

Values

TABLE 21

| Value | Description | Remarks |
|---|---|---|
| 0 | Not depressed | |
| 1 | depressed | |
| 2 | Beyond autonomy deceleration | |

Remarks

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 13:
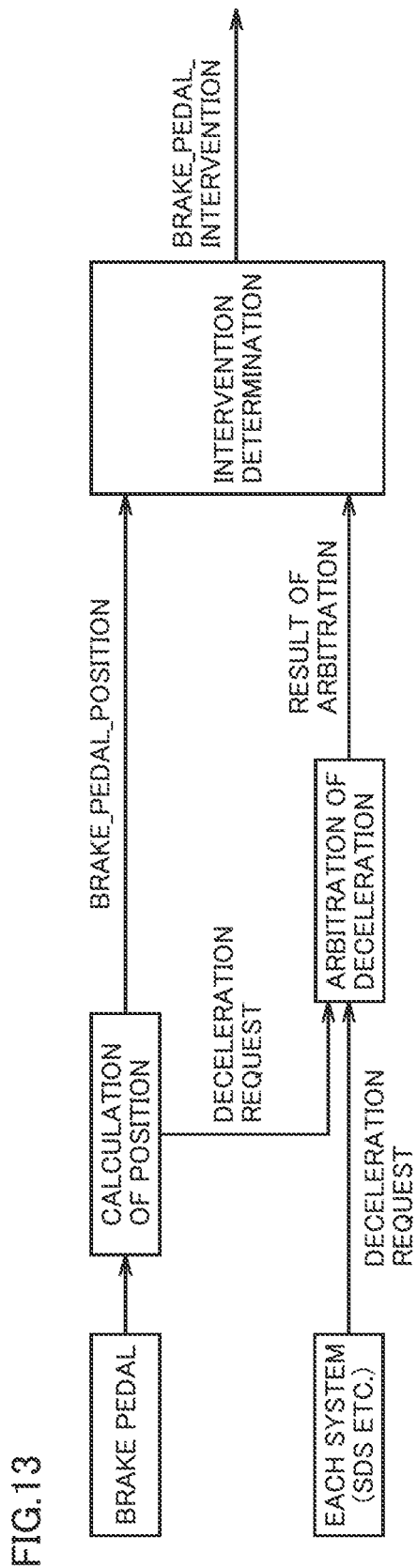
FIG. 13 is a diagram illustrating intervention by a brake pedal.

Detail design (FIG. 13)

3.3.3.20. Steering_Wheel_Intervention

This signal shows whether the steering wheel is turned by a driver (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A

3.3.3.22. WheelSpeed_FL, WheelSpeed_FR, WheelSpeed_RL, WheelSpeed_RR wheel speed value Values

TABLE 24

| Value | Description | Remarks |
|---|---|---|
| others | Velocity [unit: m/s] | |
| Maximum Value | Invalid value | The sensor is invalid. |

Remarks

T.B.D

3.3.3.23. WheelSpeed_FL_Rotation, WheelSpeed_FR_Rotation, WheelSpeed_RL_Rotation, WheelSpeed_RR_Rotation Rotation direction of each wheel Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation direction of wheel

Values

TABLE 26

| value | Description | remarks |
|---|---|---|
| 0 | Forward | |
| 1 | Reverse | |
| 2 | Standstill | |
| 3 | Undefined | |

Remarks

This signal shews "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated longitudinal velocity of vehicle

Values

TABLE 27

| Value | Description | Remarks |
|---|---|---|
| others | Velocity [unit: m/s] | |
| Maximum Value | Invalid value | The sensor is invalid. |

Remarks

This signal is output as the absolute value.

3.3.3.26. Longitudinal_Acceleration

Estimated longitudinal acceleration of vehicle

Values

TABLE 28

| value | Description | Remarks |
|---|---|---|
| others | Acceleration [unit: m/s$^2$] | |
| Minimum Value | Invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral_Acceleration

Sensor value of lateral acceleration of vehicle

Values

TABLE 29

| Value | Description | Remarks |
|---|---|---|
| others | Acceleration [unit: m/s$^2$] | |
| Minimum Value | Invalid value | The sensor is invalid. |

Remarks

The positive value means counterclockwise. The negative value means clockwise.

3.3.3.28. Yawrate

Sensor value of Yaw rate

Values

TABLE 30

| Value | Description | Remarks |
|---|---|---|
| others | Yaw rate [unit: deg/s] | |
| Minimum Value | Invalid value | The sensor is invalid. |

Remarks

The positive value means counterclockwise. The negative value means clockwise.

3.3.3.29. Autonomy_State

State of whether autonomy mode or manual mode

Values

TABLE 31

| value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

3.3.3.30. Autonomy_Ready

Situation of whether the vehicle can transition to autonomy mode or not

Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks

This signal is a part of transition conditions toward the Autonomy mode.
Please see the summary of conditions.

3.3.3.31. Autonomy_Fault

Status of whether the fault regarding a functionality in autonomy mode occurs or not Values

TABLE 33

| value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.
[T.B.D.] Need to consider the condition to release the status of "fault".

3.4. APIs for BODY Control

3.4.1. Functions

T.B.D.

3.4.2. Inputs

TABLE 34

| Signal Name | Description | Redundancy |
|---|---|---|
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |

TABLE 34-continued

| Signal Name | Description | Redundancy |
|---|---|---|
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform

Values

TABLE 35

| value | Description | remarks |
|---|---|---|
| 0 | OFF | Blinker OFF |
| 1 | Right | Right blinker ON |
| 2 | Left | Left blinker ON |
| 3 | reserved | |

Remarks

T.B.D.

Detailed Design

When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to control the headlight mode of the vehicle platform

Values

TABLE 36

| Value | Description | remarks |
|---|---|---|
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.

Driver input overrides this command.

Headlight mode changes when Vehicle platform receives once this command.

3.4.2.3. Hazardlight_Mode_Command

Command to control the hazardlight mode of the vehicle platform

Values

TABLE 37

| value | Description | remarks |
|---|---|---|
| 0 | OFF | command for hazardlight OFF |
| 1 | ON | command for hazardlight ON |

Remarks

Driver input overrides this command.

Hazardlight is active during Vehicle Platform receives ON command.

3.4.2.4. Horn_Pattern_Command

Command to control the pattern of horn ON-time and OFF-time per cycle of the vehicle platform Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.

Detail is under internal discussion.

3.4.2.5. Horn_Number_of_Cycle_Command

Command to control the Number of horn ON/OFF cycle of the vehicle platform

Values

0~7 [−]

Remarks

Detail is under internal discussion.

3.4.2.6. Horn_Continuous_Command

Command to control of horn ON of the vehicle platform

Values

TABLE 39

| value | Description | remarks |
|---|---|---|
| 0 | No request | |
| 1 | ON request | |

Remarks

This command overrides Horn_Pattern_Command, Horn_ Number_of_Cycle_Command.
Horn is active during Vehicle Platform receives ON command.
Detail is under internal discussion.

3.4.2.7. Windshieldwiper_Mode_Front_Command

Command to control the front windshield wiper of the vehicle platform

Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.
This command is valid when Windshieldwiper_Front_Driver_Input=OFF or Auto mode ON.
Driver input overrides this command.
Windshieldwiper mode is kept during Vehicle platform is receiving the command.

3.4.2.8. Windshieldwiper_Intermittent_Wiping_Speed_Command

Command to control the Windshield wiper actuation interval at the Intermittent mode Values

TABLE 41

| value | Description | remarks |
|---|---|---|
| 0 | FAST | |
| 1 | SECOND FAST | |
| 2 | THIRD FAST | |
| 3 | SLOW | |

Remarks

This command is valid when Windshieldwiper_Mode_Front_Status=INT.
Driver input overrides this command.
Windshieldwiper intermittent mode changes when Vehicle platform receives once this command.

3.4.2.9. Windshieldwiper_Mode_Rear_Command

Command to control the rear windshield wiper mode of the vehicle platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks

Driver input overrides this command.
Windshieldwiper mode is kept during Vehicle platform is receiving the command.
Wiping speed of intermittent mode is not variable.

3.4.2.10. Hvac_1st_Command

Command to start/stop 1st row air conditioning control

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

The hvac of S-AM has a synchronization functionality. Therefore, in order to control 4 (four) hvacs (1st_left/right, 2nd_left/right) individually, VCIB achieves the following procedure after Ready-ON. (This functionality will be implemented from the CV.)

1: Hvac_1st_Command=ON
2: Hvac_2nd_Command=ON
3: Hvac_TargetTemperature_2nd_Left_Command
4: Hvac_TargetTemperature_2nd_Right_Command
5: Hvac_Fan_Level_2nd_Row_Command
6: Hvac_2nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command \* The interval between each command needs 200 ms or more.
\* Other commands are able to be executed after #1.

3.4.2.11. Hvac_2nd_Command

Command to start/stop 2nd row air conditioning control

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks

N/A

3.4.2.12. Hvac_TargetTemperature_1st_Left_Command

Command to set the target temperature around front left area

Values

TABLE 45

| value | Description | Remarks |
|---|---|---|
| 0 | No request | |
| 60 to 85 [unit: ° F.] (by 1.0° F.) | Temperature direction | |

N/A

3.4.2.13. Hvac_TargetTemperature_1st_Right_Command

Command to set the target temperature around front right area

Values

TABLE 46

| value | Description | Remarks |
|---|---|---|
| 0 | No request | |
| 60 to 85 [unit: ° F.] (by 1.0° F.) | Temperature direction | |

Remarks

N/A

3.4.2.14. Hvac_TargetTemperature_2nd_Left_Command

Command to set the target temperature around rear left area

Values

TABLE 47

| value | Description | Remarks |
|---|---|---|
| 0 | No request | |
| 60 to 85 [unit: ° F.] (by 1.0° F.) | Temperature direction | |

Remarks

N/A

3.4.2.15. Hvac_TargetTemperature_2nd_Right_Command

Command to set the target temperature around rear right area

Values

TABLE 48

| value | Description | Remarks |
|---|---|---|
| 0 | No request | |
| 60 to 85 [unit: ° F.] (by 1.0° F.) | Temperature direction | |

Remarks

N/A

3.4.2.16. Hvac_Fan_Level_1st_Row_Command

Command to set the fan level on the front AC

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".
If you would like to turn the fan level to AUTO, you should transmit "Hvac_1st_Command=ON".

3.4.2.17. Hvac_Fan_Level_2nd_Row_Command

Command to set the fan level on the rear AC

Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".
If you would like to turn the fan level to AUTO, you should transmit "Hvac_2nd_Command=ON".

3.4.2.18. Hvac_1st_Row_AirOutlet_Mode_Command

Command to set the mode of 1st row air outlet

Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks

N/A 3.4.2.19. Hvac_2nd_Row_AirOutlet_Mode_CommandCommand to Set the Mode of 2nd Row Air Outlet Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks

N/A 3.4.2.20. Hvac_Recirculate_Command

Command to set the air recirculation mode

Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks

N/A 3.4.2.21. Hvac_AC_Command

Command to set the AC mode

Values

TABLE 54

| value | Description | remarks |
|---|---|---|
| 00 | No request | |
| 01 | ON | means turning the AC mode ON |
| 02 | OFF | means turning the AC mode OFF |

Remarks

N/A

3.4.3. Outputs

TABLE 55

| Signal Name | Description | Redundancy |
| --- | --- | --- |
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_1$^{st}$_Status | Status of activation of the 1$^{st}$ row HVAC | N/A |
| Hvac_2$^{nd}$_Status | Status of activation of the 2$^{nd}$ row HVAC | N/A |
| Hvac_Temperature_1$^{st}$_Left_Status | Status of set temperature of 1$^{st}$ row left | N/A |
| Hvac_Temperature_1$^{st}$_Right_Status | Status of set temperature of 1$^{st}$ row right | N/A |
| Hvac_Temperature_2$^{nd}$_Left_Status | Status of set temperature of 2$^{nd}$ row left | N/A |
| Hvac_Temperature_2$^{nd}$_Right_Status | Status of set temperature of 2$^{nd}$ row right | N/A |
| Hvac_Fan_Level_1$^{st}$_Row_Status | Status of set fan level of 1$^{st}$ row | N/A |
| Hvac_Fan_Level_2$^{nd}$_Row_Status | Status of set fan level of 2$^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status

Status of the current turnsignallight mode of the vehicle platform

Values

TABLE 56

| value | Description | Remarks |
| --- | --- | --- |
| 0 | OFF | Turn lamp = OFF |
| 1 | Left | Turn lamp L = ON (flashing) |
| 2 | Right | Turn lamp R = ON (flashing) |
| 3 | invalid | |

Remarks

At the time of the disconnection deletion of the turn lamp, state is ON.
At the time of the short detection of the turn lamp, State is OFF.

3.4.3.2. Headlight_Mode_Status

Status of the current headlight mode of the vehicle platform

Values

TABLE 57

| Value | Description | Remarks |
| --- | --- | --- |
| 0 | OFF | |
| 1 | TAIL | |
| 2 | Lo | |
| 3 | reserved | |
| 4 | Hi | |
| 5-6 | reserved | |
| 7 | invalid | |

Remarks

N/A

Detailed Design

At the time of tail signal ON, Vehicle Platform sends 1.
At the time of Lo signal ON, Vehicle Platform sends 2.
At the time of Hi signal ON, Vehicle Platform sends 4.

At the time of any signal above OFF, Vehicle Platform sends 0.

3.4.3.3. Hazardlight_Mode_Status

Status of the current hazard lamp mode of the vehicle platform

Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks

N/A

3.4.3.4. Horn_Status

Status of the current horn of the vehicle platform

Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks cannot detect any failure.
Vehicle platform sends "1" during Horn Pattern Command is active, if the horn is OFF.

3.4.3.5. Windshieldwiper_Mode_Front_Status

Status of the current front windshield wiper mode of the vehicle platform

Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |

TABLE 60-continued

| Value | Description | Remarks |
|---|---|---|
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks

Fail Mode Conditions detect signal discontinuity
cannot detect except the above failure.

3.4.3.6. Windshieldwiper_Mode_Rear_Status

Status of the current rear windshield wiper mode of the vehicle platform

Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks cannot detect any failure.

3.4.3.7. Hvac_1st Status

Status of activation of the 1st row HVAC

Values

TABLE 63

| value | Description | remarks |
|---|---|---|
| 0b | OFF | |
| 1b | ON | |

Remarks

N/A

3.4.3.8. Hvac_2nd_Status

Status of activation of the 2nd row HVAC

Values

TABLE 64

| value | Description | remarks |
|---|---|---|
| 0b | OFF | |
| 1b | ON | |

Remarks

N/A

3.4.3.9. Hvac_Temperature_1st_Left_Status

Status of set temperature of 1st row left

Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.10. Hvac_Temperature_1st_Right_Status

Status of set temperature of 1st row right

Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.11. Hvac_Temperature_2nd_Left_Status

Status of set temperature of 2nd row left

Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.12. Hvac_Temperature_2nd_Right_Status

Status of set temperature of 2nd row right

Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A

3.4.3.13. Hvac_Fan_Level_1st_Row_Status

Status of set fan level of 1st row

Values

TABLE 69

| value | Description | remarks |
|---|---|---|
| 0 | OFF | |
| 1-7 | Fan Level | |
| 8 | Undefined | |

Remarks

N/A

3.4.3.14. Hvac_Fan_Level_2nd_Row_Status

Status of set fan level of 2nd row

TABLE 70

| value | Description | remarks |
|---|---|---|
| 0 | OFF | |
| 1-7 | Fan Level | |
| 8 | Undefined | |

Remarks

N/A

3.4.3.15. Hvac_1st_Row_AirOutlet_Mode_Status

Status of mode of 1st row air outlet

Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks

N/A

3.4.3.16. Hvac_2nd_Row_AirOutlet_Mode_Status

Status of mode of 2nd row air outlet

Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks

N/A

3.4.3.17. Hvac_Recirculate_Status

Status of set air recirculation mode

Values

TABLE 73

| value | Description | remarks |
|---|---|---|
| 00 | OFF | means that the air recirculation mode is OFF |
| 01 | ON | means that the air recirculation mode is ON |

Remarks

N/A

3.4.3.18 Hvac_AC_Status

Status of set AC mode

Values

TABLE 74

| value | Description | remarks |
|---|---|---|
| 00 | OFF | means that the AC mode is OFF |
| 01 | ON | means that the AC mode is ON |

Remarks

N/A

3.4.3.19. 1st_Right_Seat_Occupancy_Status

Seat occupancy status in 1st left seat

Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks

When there is luggage on the seat, this signal may be set to "Occupied".

3.4.3.20. 1st_Left_Seat_Belt_Status

Status of driver's seat belt buckle switch

Values

TABLE 76

| value | Description | remarks |
|---|---|---|
| 0 | Buckled | |
| 1 | Unbuckled | |

TABLE 76-continued

| value | Description | remarks |
|---|---|---|
| 2 | Undetermined | |
| 3 | Fault of a switch | |

Remarks

When Driver's seat belt buckle switch status signal is not set, [undetermined] is transmitted.

It is checking to a person in charge, when using it. (Outputs "undetermined=10" as an initial value.)

The judgement result of buckling unbuckling shall be transferred to CAN transmission buffer within 1.3 s after IG_ON before allowing firing, whichever is earlier.

3.4.3.21. 1st_Right_Seat_Belt_Status

Status of passenger's seat belt buckle switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks

When Passenger's seat belt buckle switch status signal is not set, [undetermined] is transmitted.

It is checking to a person in charge, when using it. (Outputs "undetermined=10" as an initial value.)

The judgement result of buckling unbuckling shall be transferred to CAN transmission buffer within 1.3 s after IG_ON or before allowing firing, whichever is earlier.

3.4.3.22. 2nd_Left_Seat_Belt_Status

Seat belt buckle switch status in 2nd left seat

Values

TABLE 78

| value | Description | remarks |
|---|---|---|
| 0 | Buckled | |
| 1 | Unbuckled | |
| 2 | Undetermined | |
| 3 | Reserved | |

Remarks cannot detect sensor failure.

3.4.3.23. 2nd_Right_Seat_Belt_Status

Seat belt buckle switch status in 2nd right seat

Values

TABLE 79

| value | Description | remarks |
|---|---|---|
| 0 | Buckled | |
| 1 | Unbuckled | |
| 2 | Undetermined | |
| 3 | Reserved | |

Remarks cannot detect any failure.

3.5. APIs for Power Control

3.5.1. Functions

T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to control the power mode of the vehicle platform

Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Mode], which are controllable via API.

Sleep

Vehicle power off condition. In this mode, the high voltage battery does not supply power, and neither VCIB nor other VP ECUs are activated.

Wake

VCIB is awake by the low voltage battery. In this mode, ECUs other than VCIB are not awake except for some of the body electrical ECUs.

Driving Mode

Ready ON mode. In this mode, the high voltage battery supplies power to the whole VP and all the VP ECUs including VCIB are awake.

3.5.3. Outputs

TABLE 82

| Signal Name | Description | Redundancy |
| --- | --- | --- |
| Power_Mode_Status | Status of the current power mode of the vehicle platform | N/A |

3.5.3.1. Power_Mode_Status

Status of the current power mode of the vehicle platform

Values

TABLE 83

| Value | Description | Remarks |
| --- | --- | --- |
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |
| 07 | unknown | means unhealthy situation would occur |

Remarks

VCIB will transmit [Sleep] as Power_Mode_Status continuously for 3000 [ms] after executing the sleep sequence. And then, VCIB will be shutdown.

3.6. APIs for Safety

3.6.1. Functions

T.B.D.

3.6.2. Inputs

TABLE 84

| Signal Name | Description | Redundancy |
| --- | --- | --- |
| T.B.D. | | |

3.6.3. Outputs

TABLE 85

| Signal Name | Description | Redundancy |
| --- | --- | --- |
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for operation according to states of vehicle platform toward ADS

Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks

T.B.D.

3.6.3.2. Passive_Safety_Functions_Triggered

Crash Detection Signal

Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall send a voltage OFF request for 5 s or less after crash in HV vehicle.

Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System Status

Values

TABLE 88

| value | Description | remarks |
|---|---|---|
| 0 | Normal | — |
| 1 | Failure detected | — |

Remarks

When the Failure is detected, Safe stop is moved.

3.6.3.4. Propulsive_System_Degradation_Modes

Indicate Powertrain_System Status

Values

TABLE 89

| value | Description | remarks |
|---|---|---|
| 0 | Normal | — |
| 1 | Failure detected | — |

Remarks

When the Failure is detected, Safe stop is moved.

3.6.3.5 Direction_Control_Degradation_Modes

Indicate Direction_Control Status

Values

TABLE 90

| value | Description | remarks |
|---|---|---|
| 0 | Normal | — |
| 1 | Failure detected | — |

Remarks

When the Failure is detected, Safe stop is moved.
When the Failure is detected, Propulsion Direction Command is refused.

3.6.3.6. WheelLock_Control_Degradation_Modes

Indicate WheelLock_Control Status

Values

TABLE 91

| value | Description | remarks |
|---|---|---|
| 0 | Normal | — |
| 1 | Failure detected | — |

Remarks

Primary indicates EPB status, and Secondary indicates SBW indicates.

When the Failure is detected, Safe stop is moved.

3.6.3.7. Steering_System_Degradation_Modes

Indicate Steering_System Status

Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks

When the Failure are detected, Safe stop is moved.

3.6.3.8. Power_System_Degradation_Modes

[T.B.D]

3.6.3.9. Communication_Degradation_Modes

[T.B.D]

3.7. APIs for Security

3.7.1. Functions

T.B.D.

3.7.2. Inputs

TABLE 93

| Signal Name | Description | Redundancy |
|---|---|---|
| 1st_Left_Door_Lock_Command | Command to control each door | N/A |
| 1st_Right_Door_Lock_Command | lock of the vehicle platform | N/A |
| 2nd_Left_Door_Lock_Command | Lock command supports only | N/A |
| 2nd_Right_Door_Lock_Command | ALL Door Lock. Unlock command supports 1st-left Door unlock only, and ALL Door unlock. Trunk Door Lock/unlock command include in ALL Door lock/unlock | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to control each door lock of the vehicle platform Values

TABLE 94

| Value | Description | Remarks |
|---|---|---|
| 0 | No Request | |
| 1 | Lock (unsupported) | |
| 2 | Unlock | |
| 3 | reserved | |

Remarks

Lock command supports only ALL Door Lock.
Unlock command supports 1st-left Door unlock only, and ALL Door unlock.

3.7.2.2. Central_Vehicle_Lock_Exterior_Command

Command to control the all door lock of the vehicle platform.

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks

Lock command supports only ALL Door Lock
Unlock command supports 1st-left Door unlock only, and ALL Door unlock.

3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the current 1st-left door lock mode of the vehicle platform

Values

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks cannot detect any failure.

3.7.3.2. 1st_Right_Door_Lock_Status

Status of the current 1st-right door lock mode of the vehicle platform

Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the current 2nd-left door lock mode of the vehicle platform

Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks cannot detect any failure.

3.7.3.4. 2nd_Right_Door_Lock_Status

Status of the current 2nd-right door lock mode of the vehicle platform

Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the current all door lock mode of the vehicle platform

Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status,
in case any door unlocked, sends 0.
in case all door locked, sends 1.

3.7.3.6 Vehicle_Alarm_Status

Status of the current vehicle alarm of the vehicle platform

Values

TABLE 102

| Value | Description | remarks |
|---|---|---|
| 0 | Disarmed | Auto alarm system not active |
| 1 | Armed | Auto alarm system active • not on alert |
| 2 | Active | Auto alarm system active • on alert |
| 3 | invalid | |

Remarks

N/A

3.8. APIs for MaaS Service

3.8.1. Functions

T.B.D.

3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]

History of Revision

TABLE 105

| Date of Revision | ver. | Summary of Revision | Reviser |
|---|---|---|---|
| 2019 Nov. 4 | 0.1 | Creating a new material | MaaS Business Div. |

Index
1. General Concept 4
1.1. Purpose of this Specification 4
1.2. Target Vehicle Type 4
1.3. Target Electronic Platform 4
1.4. Definition of Term 4
1.5. Precaution for Handling 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
   3.3.1. The countermeasure for a remote attack 11
   3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 14
5. Function Allocation 15
5.1. in a healthy situation 15
5.2. in a single failure 16
6. Data Collection 18
6.1. At event 18
6.2. Constantly 18

1. General Concept

1.1. Purpose of this Specification

This document is an architecture specification of Toyota's MaaS Vehicle Platform and contains the outline of system in vehicle level.

1.2. Target Vehicle Type

This specification is applied to the Toyota vehicles with the electronic platform called 19ePF [ver. 1 and ver. 2].

The representative vehicle with 19ePF is shown as follows.

e-Palette, Sienna, RAV4, and so on.

1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.

All the contents are subject to change. Such changes are notified to the users. Please note that some parts are still T.B.D. will be updated in the future.

2. Architectural Concept

2.1. Overall Structure of MaaS

Figure 14:
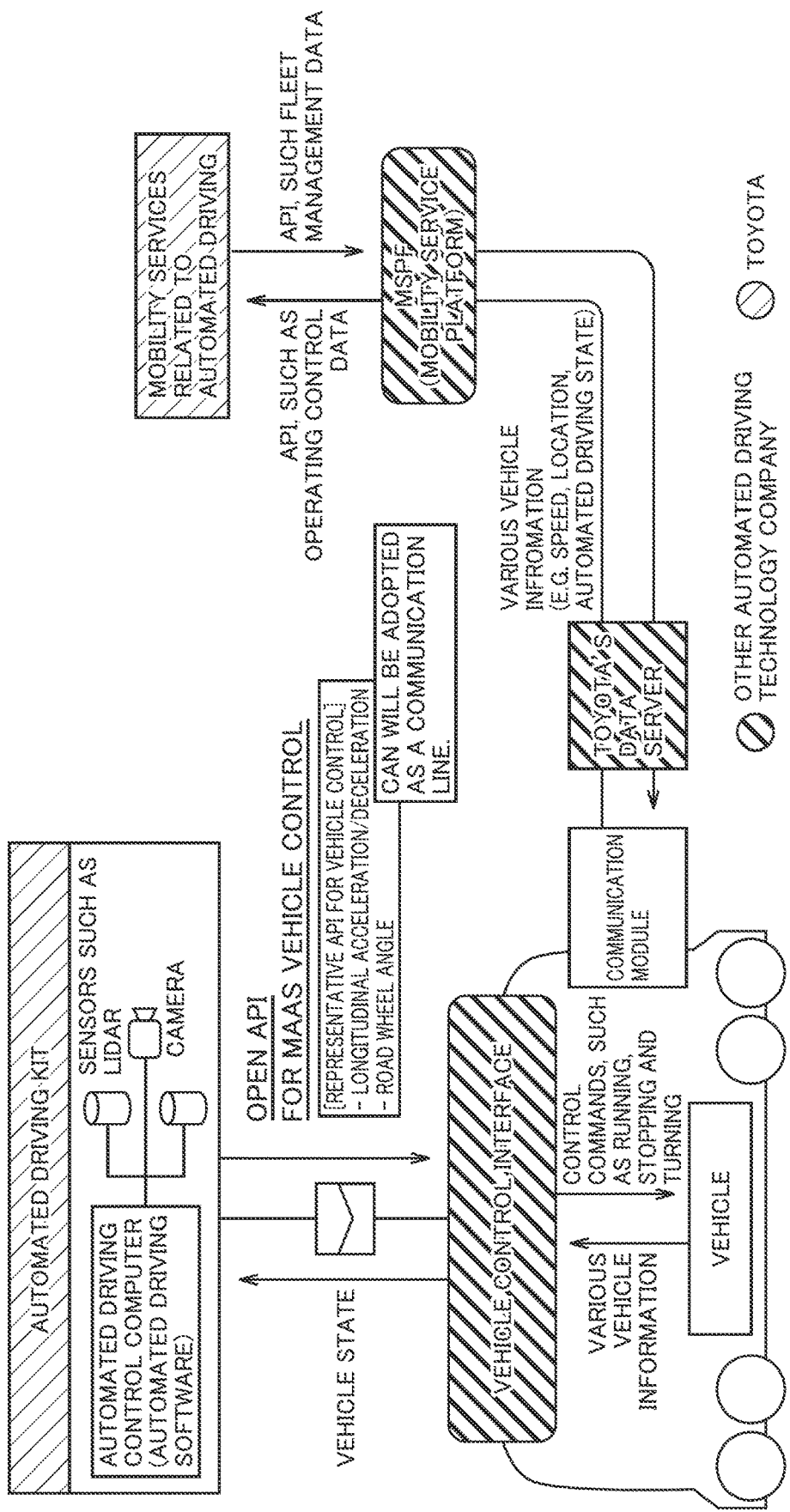
FIG. 14 is a diagram of an overall configuration of MaaS.

The overall structure of MaaS with the target vehicle is shown (FIG. 14).

Vehicle control technology is being used as an interface for technology providers.

Technology providers can receive open API such as vehicle state and vehicle control, necessary for development of automated driving systems.

2.2. Outline of System Architecture on the Vehicle

Figure 15:
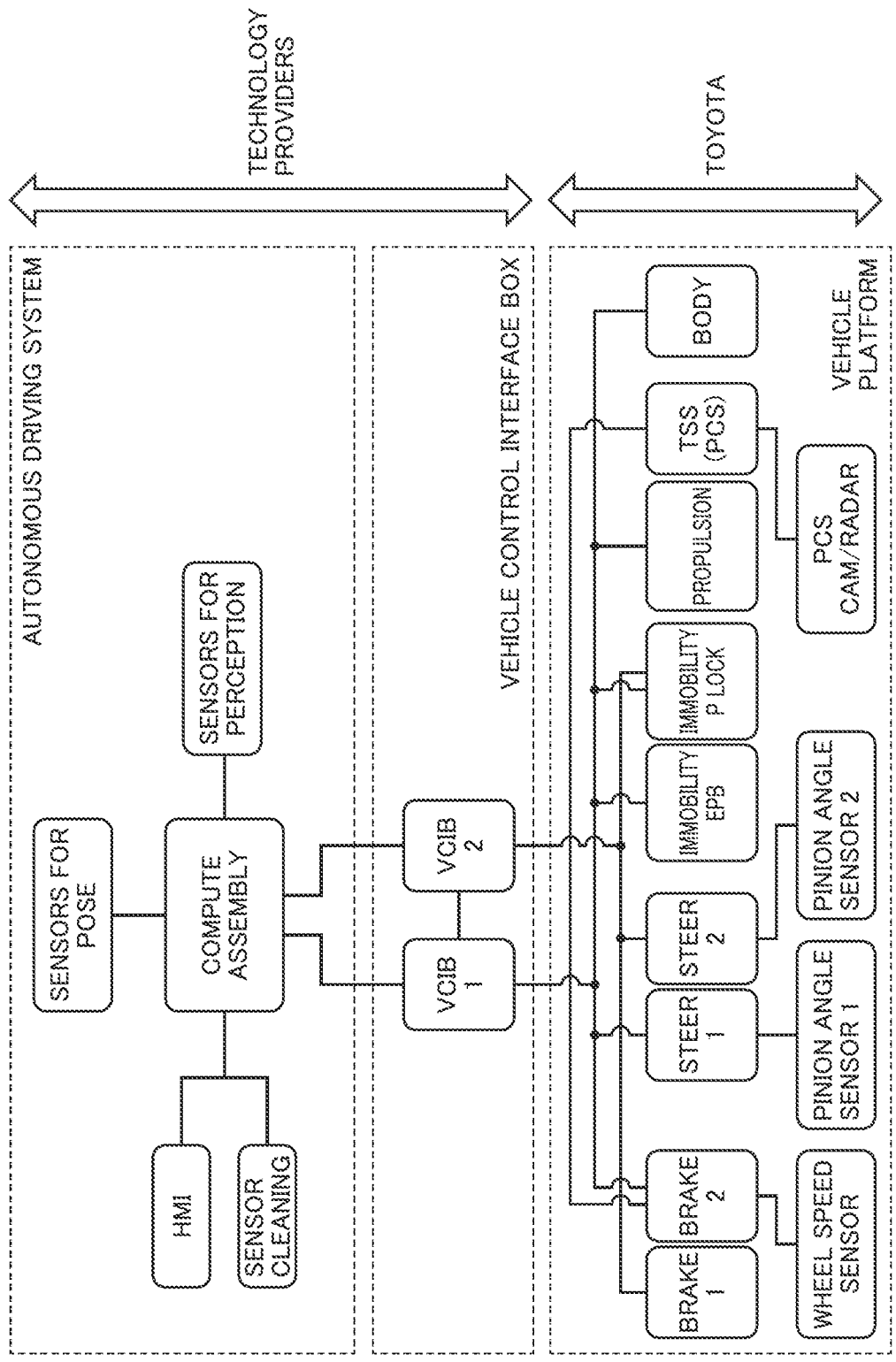
FIG. 15 is a diagram of a system configuration of a vehicle.

The system architecture on the vehicle as a premise is shown (FIG. 15).

The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 16:
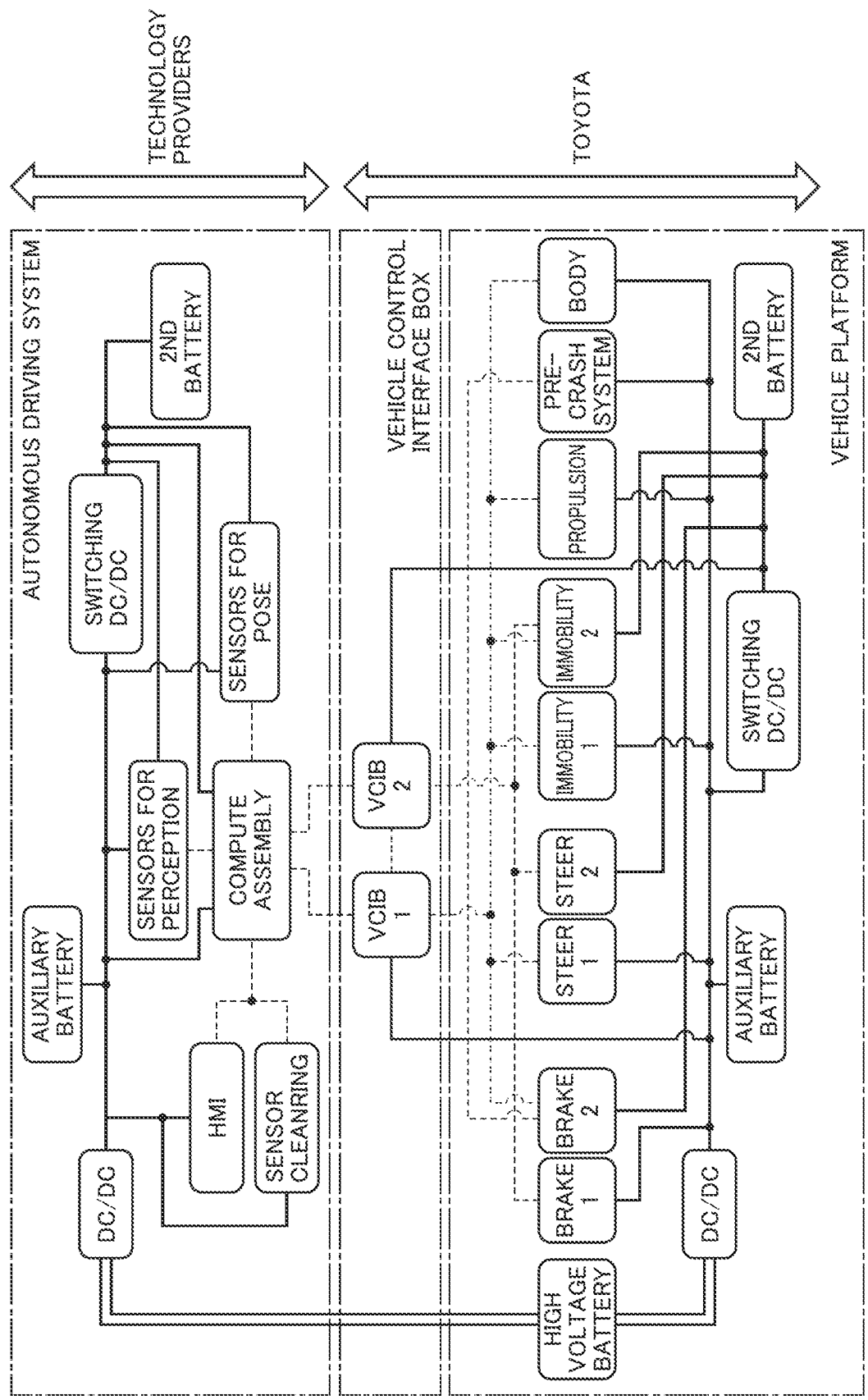
FIG. 16 is a diagram showing a configuration of supply of power of the vehicle.

The power supply architecture as a premise is shown as follows (FIG. 16).

The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept

3.1. Overall Safety Concept

The basic safety concept is shown as follows.

Figure 17:
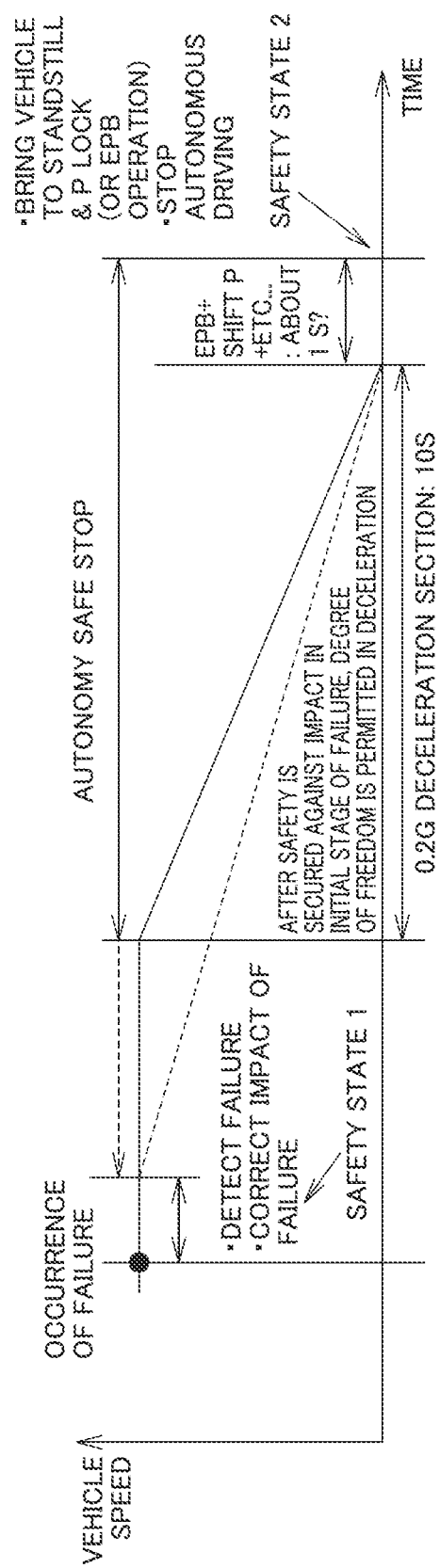
FIG. 17 is a diagram illustrating strategies until the vehicle is safely brought to a standstill at the time of occurrence of a failure.

The strategy of bringing the vehicle to a safe stop when a failure occurs is shown as follows (FIG. 17).

1. After occurrence of a failure, the entire vehicle executes "detecting a failure" and "correcting an impact of failure" and then achieves the safety state 1.

2. Obeying the instructions from the ADS, the entire vehicle slops in a safe space at a safe speed (assumed less than 0.2 G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
|---|---|
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has live following redundant functionalities to meet the safety goals led from the functional safety analysis.

Redundant Braking

Any single failure on the Braking System doesn't cause loss of braking functionality. However, depending on w here the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept

4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.

Remote Attack

To vehicle
   Spoofing the center
   ECU Software Alternation
   DoS Attack
   Sniffering
From vehicle
   Spoofing the other vehicle
   Software Alternation for a center or an ECU on the other vehicle
   DoS Attack to a center or oilier vehicle
   Uploading illegal data

Modification

Illegal Reprogramming
Setting up an illegal ADK
Installation of an unauthenticated product by a customer

4.3. Countermeasure for the Risks

The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of at unauthorized kit. For measures against attachment of an unauthorized product by an Autono-MaaS vehicle user, live contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation

5.1. In a Healthy Situation

Figure 18:
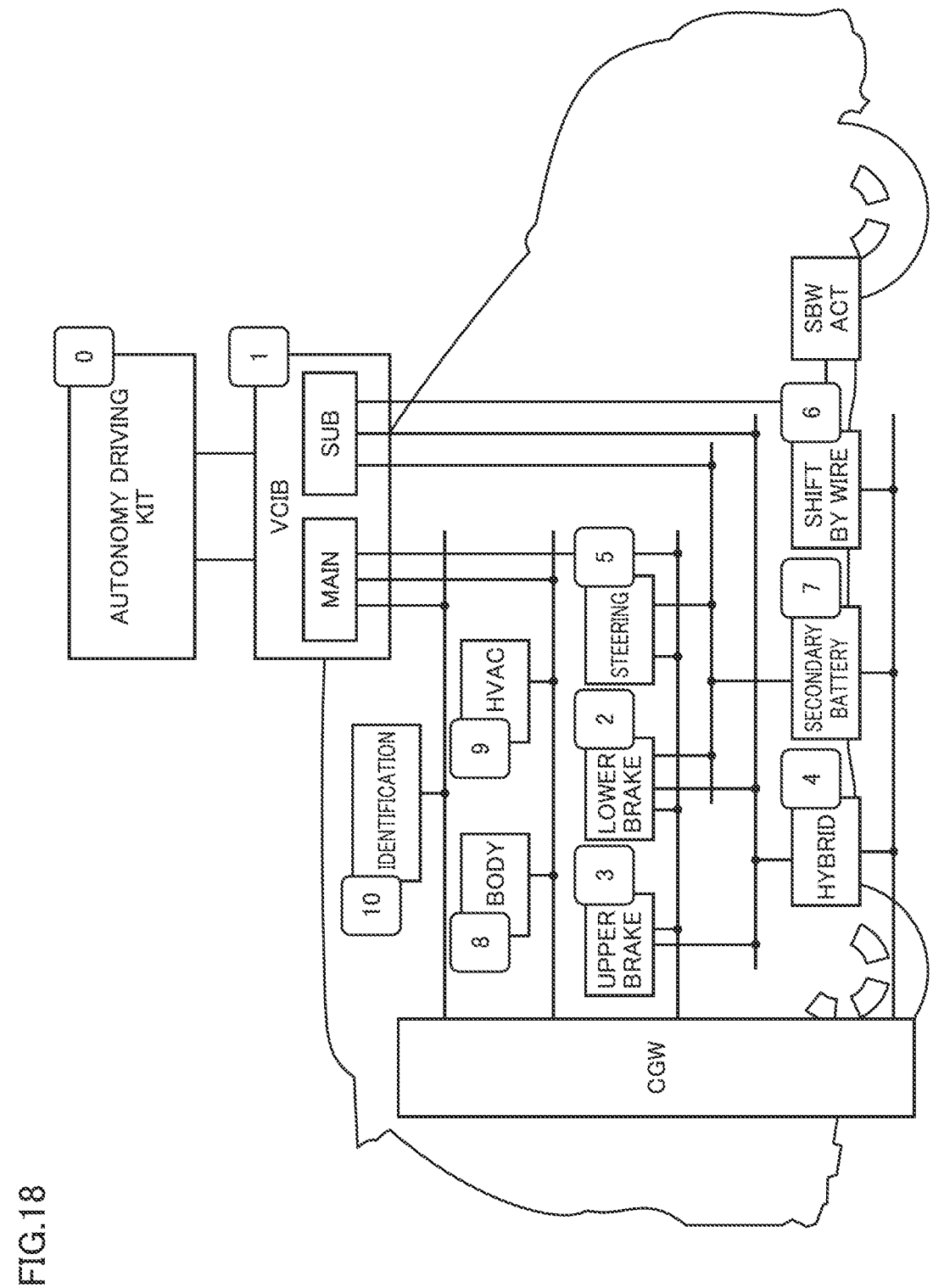
FIG. 18 is a diagram showing arrangement of representative functions of the vehicle.

The allocation of representative functionalities is shown as below (FIG. 18).

Function Allocation

TABLE 108

| Function category | Function name | Related to # | remarks |
|---|---|---|---|
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |

TABLE 108-continued

| Function category | Function name | Related to # | remarks |
|---|---|---|---|
| | Message Authentication | 1 | One system with redundancy |
| | Door locking control | 8 | |
| Longitudinal/Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention Is defined by the terms of the claims and is intended to include any modifications within the scope and meaning equivalent to the terms of the claims.

What is claimed is:

1. A vehicle comprising:
   an autonomous driving system that creates a driving plan;
   a vehicle platform that carries out vehicle control in accordance with an instruction from the autonomous driving system; and
   a vehicle control interface box that interfaces between the vehicle platform and the autonomous driving system, wherein
   the autonomous driving system includes a power supply structure independently of a power supply structure for the vehicle platform, wherein
   the vehicle platform includes
      a high-voltage battery,
      a first primary power supply system that receives supply of electric power from the high-voltage battery, and
      a first secondary power supply system as a redundant power supply for the vehicle platform, and
   the autonomous driving system includes
      a second primary power supply system that receives supply of electric power from the high-voltage battery, and
      a second secondary power supply system as a redundant power supply for the autonomous driving system.

2. The vehicle according to claim 1, wherein
   when a power feed function of the first primary power supply system fails, the first secondary power supply system keeps for a certain time period, feeding power to a limited system of systems that configure the vehicle platform.

3. The vehicle according to claim 2, wherein
   the limited system includes a brake system, a steering system, and a vehicle immobilization system.

4. The vehicle according to claim 1, wherein
   when a power feed function of the first primary power supply system fails, the first secondary power supply system keeps feeding power to the vehicle control interface box.

5. The vehicle according to claim 1, wherein
   the first primary power supply system includes
      a DC/DC converter that subjects electric power from the high-voltage battery to voltage conversion, and
      an auxiliary battery connected to an output of the DC/DC converter,
   the first secondary power supply system includes
      a switching DC/DC converter connected to the output of the DC/DC converter, and
      a secondary battery connected to an output of the switching DC/DC converter, and
   when a power feed function of the first primary power supply system fails, the switching DC/DC converter electrically disconnects the secondary battery from the first primary power supply system.

6. A power supply system of a vehicle, the vehicle including an autonomous driving system that creates a driving plan, a vehicle platform that carries out vehicle control in accordance with an instruction from the autonomous driving system, and a vehicle control interface box that interfaces between the vehicle platform and the autonomous driving system, the power supply system comprising:
   a first power supply system that implements a power supply of the vehicle platform; and a second power supply system that implements a power supply of the autonomous driving system, the second power supply system being provided independently of the first power supply system, wherein the first power supply system includes
- a high-voltage battery,
- a first primary power supply system that receives supply of electric power from the high-voltage battery, and
- a first secondary power supply system as a redundant power supply for the vehicle platform, and the second power supply system includes
- a second primary power supply system that receives supply of electric power from the high-voltage battery, and
- a second secondary power supply system as a redundant power supply for the autonomous driving system.

7. The power supply system of the vehicle according to claim 6, wherein when a power feed function of the first primary power supply system fails, the first secondary power supply system keeps for a certain time period, feeding power to a limited system of systems that configure the vehicle platform.

8. The power supply system of the vehicle according to claim 7, wherein the limited system includes a brake system, a steering system, and a vehicle immobilization system.

9. The power supply system of the vehicle according to claim 6, wherein when a power feed function of the first primary power supply system fails, the first secondary power supply system keeps feeding power to the vehicle control interface box.

10. The power supply system of the vehicle according to claim 6, wherein the first primary power supply system includes
- a DC/DC converter that subjects electric power from the high-voltage battery to voltage conversion, and
- an auxiliary battery connected to an output of the DC/DC converter, the first secondary power supply system includes
- a switching DC/DC converter connected to the output of the DC/DC converter, and
- a secondary battery connected to an output of the switching DC/DC converter, and when a power feed function of the first primary power supply system fails, the switching DC/DC converter electrically disconnects the secondary battery from the first primary power supply system.

* * * * *